United States Patent
Chaudhuri et al.

(10) Patent No.: US 12,374,043 B2
(45) Date of Patent: Jul. 29, 2025

(54) UTILIZING MACHINE LEARNING MODELS FOR PATCH RETRIEVAL AND DEFORMATION IN COMPLETING THREE-DIMENSIONAL DIGITAL SHAPES

(71) Applicant: Adobe Inc., San Jose, CA (US)

(72) Inventors: Siddhartha Chaudhuri, Bangalore (IN); Bo Sun, Austin, TX (US); Vladimir Kim, Seattle, WA (US); Noam Aigerman, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 425 days.

(21) Appl. No.: 17/817,776

(22) Filed: Aug. 5, 2022

(65) Prior Publication Data

US 2024/0046567 A1 Feb. 8, 2024

(51) Int. Cl.
| | |
|---|---|
| G06T 17/00 | (2006.01) |
| G06T 17/20 | (2006.01) |
| G06V 10/22 | (2022.01) |
| G06V 10/75 | (2022.01) |

(52) U.S. Cl.
CPC ............. *G06T 17/20* (2013.01); *G06V 10/22* (2022.01); *G06V 10/754* (2022.01); *G06V 2201/12* (2022.01)

(58) Field of Classification Search
CPC . G06T 17/20; G06T 2219/2021; G06T 19/20; G06V 10/22; G06V 10/754; G06V 2201/12; G06V 10/753; G06V 10/7553; G06V 10/774; G06V 10/778; G06V 10/82; G06V 20/647
See application file for complete search history.

(56) References Cited

U.S. PATENT DOCUMENTS

| | | | | |
|---|---|---|---|---|
| 11,334,971 B2* | 5/2022 | Lin | .................. | G06V 10/82 |
| 11,587,291 B2* | 2/2023 | Wang | .................. | G06T 3/40 |
| 11,836,860 B2* | 12/2023 | Chandran | ............... | G06T 13/40 |

(Continued)

FOREIGN PATENT DOCUMENTS

CN 113379646 B * 6/2022

OTHER PUBLICATIONS

2017 Han, Xiaoguang, et al. "High-resolution shape completion using deep neural networks for global structure and local geometry inference." Proceedings of the IEEE international conference on computer vision. 2017. (Year: 2017).*

(Continued)

*Primary Examiner* — Van D Huynh
(74) *Attorney, Agent, or Firm* — Keller Preece PLLC

(57) ABSTRACT

Methods, systems, and non-transitory computer readable storage media are disclosed that utilizes machine learning models for patch retrieval and deformation in completing three-dimensional digital shapes. In particular, in one or more implementations the disclosed systems utilize a machine learning model to predict a coarse completion shape from an incomplete 3D digital shape. The disclosed systems sample coarse 3D patches from the coarse 3D digital shape and learn a shape distance function to retrieve detailed 3D shape patches in the input shape. Moreover, the disclosed systems learn a deformation for each retrieved patch and blending weights to integrate the retrieved patches into a continuous surface.

20 Claims, 20 Drawing Sheets

(56) References Cited

U.S. PATENT DOCUMENTS

| | | | | |
|---|---|---|---|---|
| 2020/0250540 | A1* | 8/2020 | Mehr | G06T 7/55 |
| 2020/0327675 | A1* | 10/2020 | Lin | G06T 5/77 |
| 2021/0350620 | A1* | 11/2021 | Bronstein | G06N 20/00 |
| 2022/0005212 | A1* | 1/2022 | Nagano | G06V 10/82 |
| 2022/0392162 | A1* | 12/2022 | Shen | G06T 17/20 |

OTHER PUBLICATIONS

2020 Peng, Yanjun, et al. "Sparse-to-dense multi-encoder shape completion of unstructured point cloud." IEEE Access 8 (2020): 30969-30978. (Year: 2020).*

2020 Li, Guoyan, et al. "N-DPC: Dense 3D point cloud completion based on improved multi-stage network." Proceedings of the 2020 9th International Conference on Computing and Pattern Recognition. 2020. (Year: 2020).*

2021 Chu, Lei, Hao Pan, and Wenping Wang. "Unsupervised shape completion via deep prior in the neural tangent kernel perspective." ACM Transactions on Graphics (TOG) 40.3 (2021): 1-17. (Year: 2021).*

Alliegro, Antonio, et al. "Denoise and contrast for category agnostic shape completion." Proceedings of the IEEE/CVF conference on computer vision and pattern recognition. 2021. (Year: 2021).*

2021 Shi, Jieqi, et al. "Graph-guided deformation for point cloud completion." IEEE Robotics and Automation Letters 6.4 (2021): 7081-7088. (Year: 2021).*

Liu, Ran et al. "Hole-filling Based on Disparity Map and Inpainting for Depth-Image-Based Rendering;" 2016; International Journal of Hybrid Information Technology, vol. 9, No. 5 (2016); pp. 145-164 (Year: 2016).*

Dragomir Anguelov, Praveen Srinivasan, Daphne Koller, Sebastian Thrun, Jim Rodgers, and James Davis. SCAPE: Shape completion and animation of people. ACM Transac-tions on Graphics (TOG), 24:408-416, Jul. 2005.

Connelly Barnes, Eli Shechtman, Adam Finkelstein, and Dan B Goldman. Patch Match: A randomized correspondence algorithm for structural image editing. ACM Transactions on Graphics (Proc. SIGGRAPH), 28(3), Aug. 2009.

Paul J. Besl and Neil D. McKay. A method for registration of 3-d shapes. IEEE Trans. Pattern Anal. Mach. Intell., 14(2):239-256, 1992.

Volker Blanz and Thomas Vetter. A morphable model for the synthesis of 3d faces. In Proceedings of the 26th Annual Conference on Computer Graphics and Interactive Techniques, SIGGRAPH '99, p. 187-194, USA, 1999. ACM Press/Addison-Wesley Publishing Co.

Rohan Chabra, Jan E. Lenssen, Eddy Ilg, Tanner Schmidt, Julian Straub, Steven Lovegrove, and Richard Newcombe. Deep local shapes: Learning local sdf priors for detailed 3d reconstruction. In ECCV, 2020.

Angel X. Chang, Thomas Funkhouser, Leonidas Guibas, Pat Hanrahan, Qixing Huang, Zimo Li, Silvio Savarese, Manolis Savva, Shuran Song, Hao Su, Jianxiong Xiao, Li Yi, and Fisher Yu. ShapeNet: An Information-Rich 3D Model Repository. Technical Report arXiv:1512.03012 [cs.GR], Stanford University—Princeton University—Toyota Tech-nological Institute at Chicago, 2015.

Siddhartha Chaudhuri and Vladlen Koltun. Data-driven suggestions for creativity support in 3d modeling. ACM Transactions on Graphics, 29, 12 2010.

Zhiqin Chen, Vladimir G. Kim, Matthew Fisher, Noam Aigerman, Hao Zhang, and Siddhartha Chaudhuri. Decorgan: 3d shape detailization by conditional refinement. Proceedings of IEEE Conference on Computer Vision and Pattern Recognition (CVPR), 2021.

Zhang Chen, Yinda Zhang, Kyle Genova, Sean Fanello, Sofien Bouaziz, Christian Hane, Ruofei Du, Cem Keskin, Thomas Funkhouser, and Danhang Tang. Multiresolution deep implicit functions for 3d shape representation. In ICCV, 2021.

Brian Curless and Marc Levoy. A volumetric method for building complex models from range images. In Proceedings of the 23rd Annual Conference on Computer Graphics and Interactive Techniques, SIGGRAPH '96, p. 303-312, New York, NY, USA, 1996. Association for Computing Machinery.

Angela Dai, Angel X. Chang, Manolis Savva, Maciej Halber, Thomas Funkhouser, and Matthias Nießner. Scannet: Richly-annotated 3d reconstructions of indoor scenes. In Proc. Computer Vision and Pattern Recognition (CVPR), IEEE, 2017.

Angela Dai, Charles Ruizhongtai Qi, and Matthias Nießner. Shape completion using 3d-encoder-predictor cnns and shape synthesis. In Proc. Computer Vision and Pattern Recognition (CVPR), IEEE, 2017.

James Davis, S.R. Marschner, Matt Garr, and Marc Levoy. Filling holes in complex surfaces using volumetric diffusion. pp. 428-441, Feb. 2002.

Alexei A. Efros and Thomas K. Leung. Texture synthesis by non-parametric sampling. In IEEE International Conference on Computer Vision (ICCV), 1999.

Kyle Genova, Forrester Cole, Avneesh Sud, Aaron Sarna, and Thomas Funkhouser. Local deep implicit functions for 3d shape. InCVPR, 2019.

Thibault Groueix, Matthew Fisher, Vladimir G. Kim, Bryan Russell, and Mathieu Aubry. AtlasNet: A Papier-Mache Approach to Learning 3D Surface Generation. In Proceedings IEEE Conf. on Computer Vision and Pattern Recognition (CVPR), 2018.

Xiaoyuan Guo, Jun Xiao, and Ying Wang. A survey on algorithms of hole filling in 3d surface reconstruction.The Visual Computer, 34, Jan. 2018.

X. Han, Z. Li, H. Huang, E. Kalogerakis, and Y. Yu. High-resolution shape completion using deep neural networks for global structure and local geometry inference. In IEEE International Conference on Computer Vision (ICCV), Oct. 2017.

Rana Hanocka, Amir Hertz, Noa Fish, Raja Giryes, Shachar Fleishman, and Daniel Cohen-Or. Meshcnn: A network with an edge. ACM Trans. Graph., 38(4), Jul. 2019.

Rana Hanocka, Gal Metzer, Raja Giryes, and Daniel Cohen-Or. Point2mesh: A self-prior for deformable meshes.ACM Trans. Graph., 39(4), Jul. 2020.

James Hays and Alexei A Efros. Scene completion using millions of photographs.ACM Transactions on Graphics (SIGGRAPH 2007), 26(3), 2007.

Amir Hertz, Rana Hanocka, Raja Giryes, and Daniel Cohen-Or. Deep geometric texture synthesis.ACM Trans. Graph., 39(4), 2020.

Ping Hu, Changsheng Wang, Baojun Li, and Mingzeng Liu. Filling holes in triangular meshes in engineering. JSW, 7:141-148, Jan. 2012.

Zitian Huang, Yikuan Yu, Jiawen Xu, Feng Ni, and Xinyi Le. Pf-net: Point fractal network for 3d point cloud completion. In CVPR, 2020.

Angjoo Kanazawa, Michael J. Black, David W. Jacobs, and Jitendra Malik. End-to-end recovery of human shape and pose. In2018 IEEE Conference on Computer Vision and Pattern Recognition, CVPR 2018, Salt Lake City, UT, USA, Jun. 18-22, 2018, pp. 7122-7131. Computer Vision Foundation / IEEE Computer Society, 2018.

M. Kazhdan, M. Bolitho, and H. Hoppe. Poisson surface reconstruction. In Proceedings of the fourth Eurographics symposium on Geometry processing, 2005.

M. Kazhdan and H. Hoppe. Screened poisson surface reconstruction. InACM Transactions on Graphics (TOG), 2013.

Y. M. Kim, N. J. Mitra, D.-M. Yan, and L. Guibas. Acquiring 3d indoor environments with variability and repetition. In ACM Transactions on Graphics (TOG), 2012.

Nikos Kolotouros, Georgios Pavlakos, Michael J. Black, and Kostas Daniilidis. Learning to reconstruct 3d human pose and shape via model-fitting in the loop. In2019 IEEE/CVF International Conference on Computer Vision, ICCV 2019, Seoul, Korea (South), Oct. 27-Nov. 2, 2019, pp. 2252-2261. IEEE, 2019.

Vivek Kwatra, Arno Schodl, Irfan Essa, Greg Turk, and Aaron Bobick. Graphcut textures: Image and video synthesis using graph cuts. ACM Transactions on Graphics, SIG-GRAPH 2003, 22(3):277-286, Jul. 2003.

Marc Levoy, Kari Pulli, Brian Curless, Szymon Rusinkiewicz, David Koller, Lucas Pereira, Matt Ginzton, Sean Anderson, James Davis, Jeremy Ginsberg, Jonathan Shade, and Duane Fulk. The

(56) References Cited

OTHER PUBLICATIONS digital michelangelo project: 3d scanning of large statues. In Proceedings of the 27th Annual Conference on Computer Graphics and Interactive Techniques, SIGGRAPH '00, p. 131-144, USA, 2000. ACM Press/Addison-Wesley Publishing Co.

Dongping Li, Tianjia Shao, Hongzhi Wu, and Kun Zhou. Shape completion from a single rgbd image. In IEEE Transactions on Visualization & Computer Graphics, 2016.

Manyi Li and Hao Zhang. d2im-net: learning detail disentangled implicit fields from single images. In Proceedings of the IEEE/CVF Conference on Computer Vision and Pattern Recognition (CVPR), pp. 10246-10255, Jun. 2021.

Y. Li, A. Dai, L. Guibas, and M. Nießner. Database-assisted object retrieval for real-time 3D reconstruction. In Computer Graphics Forum, 2015.

Yikang Li, Tao Ma, Yeqi Bai, Nan Duan, Sining Wei, and Xiaogang Wang. Pastegan: A semi-parametric method to generate image from scene graph. NeurIPS, 2019.

Matthew Loper, Naureen Mahmood, Javier Romero, Gerard Pons-Moll, and Michael J. Black. Smpl: A skinned multi-person linear model. ACM Trans. Graph., 34(6), Oct. 2015.

A. Nealen, T. Igarashi, O. Sorkine, and M. Alexa. Laplacian mesh optimization. In Proceedings of the 4th international conference on Computer graphics and interactive techniques, 2006.

Yutaka Ohtake, Alexander Belyaev, Marc Alexa, Greg Turk, and Hans-Peter Seidel. Multi-level partition of unity implicits. ACM Trans. Graph., 22(3):463-470, Jul. 2003.

Liang Pan, Xinyi Chen, Zhongang Cai, Junzhe Zhang, Haiyu Zhao, Shuai Yi, and Ziwei Liu. Variational relational point completion network. arXiv preprint arXiv:2104.10154, 2021.

Jeong Joon Park, Peter Florence, Julian Straub, Richard Newcombe, and Steven Lovegrove. Deepsdf: Learning continuous signed distance functions for shape representation. In The IEEE Conference on Computer Vision and Pattern Recognition (CVPR), Jun. 2019.

M. Pauly, N. J. Mitra, J. Giesen, M. H. Gross, and L. J. Guibas. Example-based 3d scan completion. In Symposium on Geometry Processing, 2005.

Georgios Pavlakos, Vasileios Choutas, Nima Ghorbani, Timo Bolkart, Ahmed A. A. Osman, Dimitrios Tzionas, and Michael J. Black. Expressive body capture: 3d hands, face, and body from a single image. In IEEE Conference on Computer Vision and Pattern Recognition, CVPR 2019, Long Beach, CA, USA, Jun. 16-20, 2019, pp. 10975-10985. Computer Vision Foundation / IEEE, 2019.

Songyou Peng, Michael Niemeyer, Lars Mescheder, Marc Pollefeys, and Andreas Geiger. Convolutional occupancy networks. In European Conference on Computer Vision (ECCV), 2020.

Xiaojuan Qi, Qifeng Chen, Jiaya Jia, and Vladlen Koltun. Semi-parametric image synthesis. InIn CVPR, 2018.

Anurag Ranjan, Timo Bolkart, Soubhik Sanyal, and Michael J. Black. Generating 3d faces using convolutional mesh autoencoders. In Vittorio Ferrari, Martial Hebert, Cristian Sminchisescu, and Yair Weiss, editors, Computer Vision—ECCV 2018—15th European Conference, Munich, Germany, Sep. 8-14, 2018, Proceedings, Part III, vol. 11207 of Lecture Notes in Computer Science, pp. 725-741. Springer, 2018.

Yurui Ren, Xiaoming Yu, Ruonan Zhang, Thomas H. Li, Shan Liu, and Ge Li. Structureflow: Image inpainting via structure-aware appearance flow. In IEEE International Conference on Computer Vision (ICCV), 2019.

J. Rock, T. Gupta, J. Thorsen, J. Gwak, D. Shin, and D. Hoiem. Completing 3d object shape from one depth image. In Proceedings of the IEEE Conference on Computer Vision and Pattern Recognition (CVPR), 2015.

Karen Simonyan and Andrew Zisserman. Very deep convolutional networks for large-scale image recognition. In ICLR, 2015.

O. Sorkine and D. Cohen-Or. Least-squares meshes. In Shape Modeling Applications, 2004.

M. Sung, V. G. Kim, R. Angst, and L. Guibas. Data-driven structural priors for shape completion. In ACM Transactions on Graphics (TOG), 2015.

Kenshi Takayama, Ryan Schmidt, Karan Singh, Takeo Igarashi, Tamy Boubekeur, and Olga Sorkine-Hornung. Geobrush: Interactive mesh geometry cloning.Computer Graphics Forum (Proc. Eurographics 2011), 30(2):613-622, 2011.

Lyne P Tchapmi, Vineet Kosaraju, S. Hamid Rezatofighi, Ian Reid, and Silvio Savarese. Topnet: Structural point cloud decoder. In The IEEE Conference on Computer Vision and Pattern Recognition (CVPR), 2019.

Hung-Yu Tseng, Hsin-Ying Lee, Lu Jiang, Ming-Hsuan Yang, and Weilong Yang. Retrievegan: Image synthesis via differentiable patch retrieval. InIn ECCV, 2020.

Greg Turk and Marc Levoy. Zippered polygon meshes from range images. In Proceedings of the 21st Annual Conference on Computer Graphics and Interactive Techniques, SIGGRAPH '94, p. 311-318, New York, NY, USA, 1994. Association for Computing Machinery.

Dmitry Ulyanov, Andrea Vedaldi, and Victor S. Lempitsky. Deep image prior. In 2018 IEEE Conference on Computer Vision and Pattern Recognition, CVPR 2018, Salt Lake City, UT, USA, Jun. 18-22, 2018, pp. 9446-9454. Computer Vision Foundation / IEEE Computer Society, 2018.

Ashish Vaswani, Noam Shazeer, Niki Parmar, Jakob Uszkoreit, Llion Jones, Aidan N Gomez, Łukasz Kaiser, and Illia Polosukhin. Attention is all you need. In I. Guyon, U. V. Luxburg, S. Bengio, H. Wallach, R. Fergus, S. Vishwanathan, and R. Garnett, editors, Advances in Neural Information Processing Systems, vol. 30. Curran Associates, Inc., 2017.

Xiaogang Wang, Marcelo H. Ang Jr., and Gim Hee Lee. Cascaded refinement network for point cloud completion. In IEEE/CVF Conference on Computer Vision and Pattern Recognition (CVPR), Jun. 2020.

Xiaogang Wang, Marcelo H. Ang Jr., and Gim Hee Lee. Voxel-based network for shape completion by leveraging edge generation. In ICCV), 2021.

Mark Wheeler, Yoichi Sato, and Katsushi Ikeuchi. Consensus surfaces for modeling 3d objects from multiple range images. pp. 917-924, Feb. 1998.

Jiajun Wu, Chengkai Zhang, Tianfan Xue, William T Freeman, and Joshua B Tenenbaum. Learning a probabilistic latent space of object shapes via 3d generative-adversarial modeling. In Advances in Neural Information Processing Systems, pp. 82-90, 2016.

Z. Wu, S. Song, A. Khosla, F. Yu, L. Zhang, X. Tang, and J. Xiao. 3d shapenets: A deep representation for volumetric shape modeling. In Proceedings of 28th IEEE Conference on Computer Vision and Pattern Recognition (CVPR), 2015.

Peng Xiang, Xin Wen, Yu-Shen Liu, Yan-Pei Cao, Pengfei Wan, Wen Zheng, and Zhizhong Han. Snowflakenet: Point cloud completion by snowflake point deconvolution with skip-transformer. In ICCV, 2021.

Chulin Xie, Chuxin Wang, Bo Zhang, Hao Yang, Dong Chen, and Fang Wen. Style-based point generator with adversarial rendering for point cloud completion. In Proceedings of the IEEE/CVF Conference on Computer Vision and Pattern Recognition (CVPR), pp. 4619-4628, Jun. 2021.

Haozhe Xie, Hongxun Yao, Shangchen Zhou, Jiageng Mao, Shengping Zhang, and Wenxiu Sun. Grnet: Gridding residual network for dense point cloud completion. In ECCV, 2020.

Xuehan Xiong and Fernando De la Torre. Supervised descent method and its applications to face alignment. pp. 532-539, Jun. 2013.

Rui Xu, Minghao Guo, Jiaqi Wang, Xiaoxiao Li, Bolei Zhou, and Chen Change Loy. Texture memory-augmented deep patch-based image inpainting. In IEEE Transactions on Image Processing (TIP), 2021.

Fuzhi Yang, Huan Yang, Jianlong Fu, Hongtao Lu, and Baining Guo. Learning texture transformer network for image super-resolution. In CVPR, Jun. 2020.

Xumin Yu, Yongming Rao, Ziyi Wang, Zuyan Liu, Jiwen Lu, and Jie Zhou. Pointr: Diverse point cloud completion with geometry-aware transformers. In ICCV, 2021.

Wentao Yuan, Tejas Khot, David Held, Christoph Mertz, and Martial Hebert. Pcn: Point completion network. In 3D Vision (3DV), 2018 International Conference on 3D Vision, 2018.

(56) References Cited

OTHER PUBLICATIONS

Wenxiao Zhang, Qingan Yan, and Chunxia Xiao. Detail preserved point cloud completion via separated feature aggregation. In ECCV, 2020.

W. Zhao, R. Chellappa, P. J. Phillips, and A. Rosenfeld. Face recognition: A literature survey. ACM Comput. Surv., 35(4):399-458, Dec. 2003.

Kun Zhou, Xin Huang, Xi Wang, Yiying Tong, Mathieu Desbrun, Baining Guo, and Heung-Yeung Shum. Mesh quilting for geometric texture synthesis. In ACM SIGGRAPH 2006 Papers, SIGGRAPH '06, p. 690-697, 2006.

* cited by examiner

| | Average | Chair | Plane | Car | Table | Cabinet | Lamp | Boat | Couch |
|---|---|---|---|---|---|---|---|---|---|
| AtlasNet | 7.03 | 6.08 | 2.32 | 5.32 | 5.38 | 8.46 | 14.20 | 6.01 | 8.47 |
| Conv-ONet | 6.42 | 2.91 | 2.29 | 8.60 | 7.94 | 12.6 | 5.82 | 4.03 | 7.21 |
| TopNet | 6.30 | 5.94 | 2.18 | 4.85 | 5.63 | 5.13 | 15.32 | 5.60 | 5.73 |
| 3D-GAN | 6.00 | 6.02 | 1.77 | 3.46 | 5.08 | 7.29 | 12.23 | 7.20 | 4.92 |
| PCN | 4.47 | 3.75 | 1.45 | 3.58 | 3.32 | 4.82 | 10.56 | 4.22 | 4.03 |
| GRNet | 2.69 | 3.27 | 1.47 | 3.15 | 2.43 | 3.35 | 2.54 | 2.50 | 2.84 |
| VRCNet | 2.63 | 2.96 | 1.30 | 3.25 | 2.35 | 2.98 | 2.86 | 2.23 | 3.13 |
| SnowFlake | 2.06 | 2.45 | 0.98 | 2.55 | 2.15 | 2.76 | 2.17 | 1.33 | 2.35 |
| PatchRD (Ours) | 1.22 | 1.08 | 0.72 | 1.01 | 1.32 | 1.45 | 1.23 | 0.99 | 1.67 |

*Fig. 13A*

| | Conv-ONet | 3D-GAN | PatchRD(Ours) |
|---|---|---|---|
| FID | 174.72 | 157.19 | 11.89 |

*Fig. 13B*

| | CD | FID |
|---|---|---|
| Patch Alignment | 4.90 | 43.35 |
| No Blending | 2.03 | 30.25 |
| No Smoothing | 1.86 | 27.42 |
| All | 1.43 | 11.89 |

1900

```
┌─────────────────────────────────────────────────────────────────┐
│  Generating A Coarse 3D Digital Shape From An Incomplete 3D     │
│                      Digital Shape 1902                         │
└─────────────────────────────────────────────────────────────────┘
                                │
                                ▼
┌─────────────────────────────────────────────────────────────────┐
│   Sampling Coarse 3D Patches From The Coarse 3D Digital Shape   │
│                              1904                               │
└─────────────────────────────────────────────────────────────────┘
                                │
                                ▼
┌─────────────────────────────────────────────────────────────────┐
│  Retrieving A Plurality Of Candidate 3D Patches From The        │
│  Incomplete 3D Digital Shape Based On The Coarse 3D Patches     │
│                              1906                               │
└─────────────────────────────────────────────────────────────────┘
                                │
                                ▼
┌─────────────────────────────────────────────────────────────────┐
│  Generating A Complete 3D Shape By Combining The Plurality Of   │
│                   Candidate 3D Patches 1908                     │
└─────────────────────────────────────────────────────────────────┘
```

*Fig. 19*

UTILIZING MACHINE LEARNING MODELS FOR PATCH RETRIEVAL AND DEFORMATION IN COMPLETING THREE-DIMENSIONAL DIGITAL SHAPES

BACKGROUND

Recent years have seen significant advancements in the field of three-dimensional modeling. For example, conventional systems have leveraged recent computing advancements to generate and render three-dimensional models in a variety of computing environments. To illustrate, conventional systems utilize computer-implemented models to complete geometric objects. For example, conventional systems can complete three-dimensional shapes to correct holes in scanned digital objects or as part of interactive shape modeling. Despite these advancements, however, conventional systems continue to suffer from a number of technical deficiencies, particularly with regard to accuracy and flexibility in generating complete geometric objects.

SUMMARY

This disclosure describes one or more embodiments of methods, non-transitory computer readable media, and systems that solve the foregoing problems (in addition to providing other benefits) by utilizing machine learning models for patch retrieval and deformation in completing three-dimensional digital shapes. For example, the disclosed systems utilize a data-driven shape completion approach that focuses on completing geometric details of missing regions of 3D shapes. In particular, in one or more embodiments, the disclosed systems copy and deform patches from partial input shapes to complete the missing regions. This approach preserves the style of local geometric features, even in applications that drastically differ from training data.

In one or more implementations, the disclosed systems proceed in two stages. First, the disclosed systems learn to retrieve candidate patches from an input 3D shape. Second, the disclosed systems select and deform some of the retrieved candidates to seamlessly blend them in to the complete shape. The disclosed systems leverage repeating patterns by retrieving patches from the partial input, and learn global structural priors by using a neural network to guide the retrieval and deformation processes. Experimental results indicate that the disclosed systems considerably outperform conventional approaches across multiple datasets and shape categories.

BRIEF DESCRIPTION OF THE DRAWINGS

Various embodiments will be described and explained with additional specificity and detail through the use of the accompanying drawings in which:

FIGS. 13A-13B illustrate additional experimental results from implementing the shape completion system in accordance with one or more implementations.

FIG. 19 illustrates a flowchart of a series of acts for generating a complete 3D digital shape from an incomplete digital 3D digital shape based on retrieving and combining candidate 3D patches in accordance with one or more implementations.

DETAILED DESCRIPTION

Figure 1:
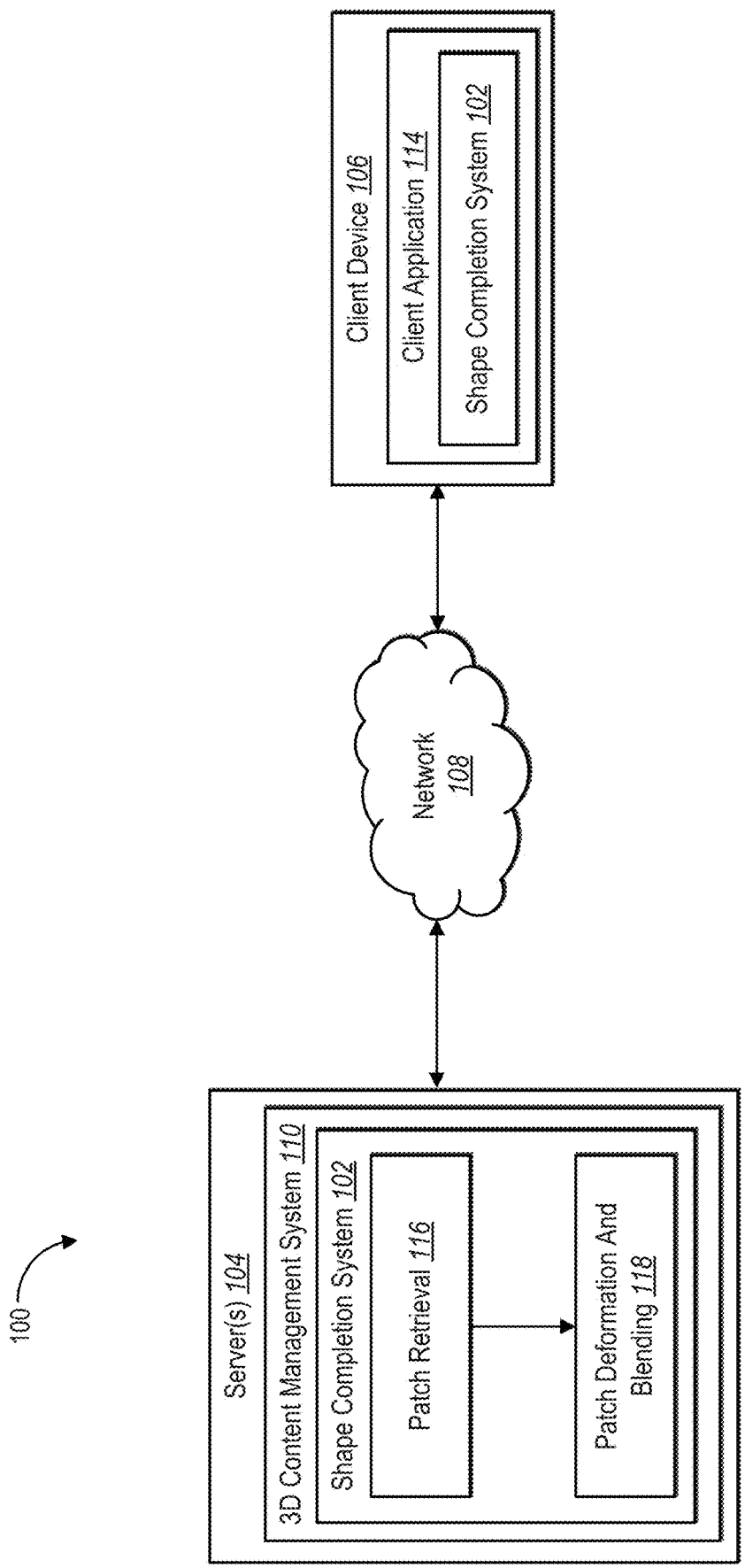
FIG. 1 illustrates an example system environment in which a shape completion system can operate in accordance with one or more implementations.

This disclosure describes one or more embodiments of a shape completion system that utilizes machine learning models for patch retrieval and deformation in completing three-dimensional digital shapes. In particular, in one or more implementations the shape completion system utilizes a machine learning model to predict a coarse completion shape from an incomplete 3D digital shape. This coarse completion shape need not necessarily capture the shape details, but can provide guidance on locations of the missing patches. The shape completion shape samples coarse voxel patches from the coarse 3D digital shape and learns a shape distance function to retrieve detailed shape patches in the input shape. Moreover, the shape completion system learns a deformation for each retrieved patch and a blending function to integrate the retrieved patches into a continuous surface. The deformation prioritizes compatibility scores between adjacent patches and the blending functions optimize the contribution of each patch to improve surface smoothness. Experimental results show that the shape completion system can outperform existing shape completion techniques both qualitatively and quantitatively.

As just mentioned, in one or more implementations the shape completion system utilizes a machine learning model to generate a coarse 3D digital shape. In particular, the shape completion system utilizes a convolutional neural network to generate a coarse 3D digital shape from an incomplete 3D digital shape. This coarse 3D digital shape provides a rough estimation of a complete shape at a lower resolution than the input 3D digital shape. Accordingly, the coarse 3D digital shape provides an estimation that the shape completion system can utilize to guide additional sampling and retrieval of candidate patches for building a complete 3D digital shape.

Indeed, in one or more implementations, the shape completion system samples coarse 3D patches from the coarse 3D digital shape. The shape completion system then utilizes these coarse 3D patches to retrieve candidate 3D patches. For example, the shape completion system extracts candidate 3D patches from the incomplete digital shape that are geometrically similar to the coarse 3D patches. In one or more implementations, the shape completion system extracts candidate 3D patches by utilizing an encoder to generate coarse 3D patch encodings and candidate 3D patch encodings within an embedding feature space. The shape completion system utilizes distances within the embedding feature space to select top-k candidate 3D patches for each coarse 3D patch.

As mentioned, in one or more embodiments the shape completion system generates a complete 3D shape by combining candidate 3D patches. For example, the shape completion system utilizes a blending-deformation machine learning model to predict transformations and blending weights for candidate 3D patches within various sub-volumes. Moreover, the shape completion system then blends the candidate 3D patches utilizing the transformations and blending weights to generate transformed sub-volumes (e.g., sub-volumes reflecting blended and smoothed shapes to fill missing regions from the incomplete 3D digital shape). By combining these sub-volumes, in one or more implementations the shape completion system generates a complete 3D shape representation from the incomplete 3D digital shape.

In one or more implementations, the shape completion system also trains the various machine learning models utilized to generate the complete 3D shape. For example, the shape completion system learns parameters for an encoder neural network so that the encoder neural network learns to project geometrically similar shapes in close proximity within a feature space. Indeed, the shape completion system utilizes sample shape pairs, determines a unique geometric distance between the sample shape pairs that is agnostic to rigid transformation, and then utilizes this geometric distance to supervise training of the encoder in mapping the shape pairs to a feature space.

Similarly, in one or more implementations, the shape completion system also trains a blending-deformation machine learning model. For example, the shape completion system utilizes a blending-deformation neural network to generate predicted transformations and predicted blending weights to generate a predicted sub-volume for a complete 3D shape. The shape completion system then determines a reconstruction loss by comparing the predicted sub-volume to a ground truth sub-volume and modifies parameters of the blending-deformation neural network based on the reconstruction loss. Similarly, in one or more implementations, the shape completion system determines a smoothness loss that reflects a measure of smoothness or agreement between overlapping patch areas. The shape completion system also modified parameters of the blending-deformation neural network based on this smoothness loss.

As mentioned, conventional systems have a number of shortcomings in relation to accuracy and flexibility of implementing computer devices. For example, some conventional systems seek to extract regions from an input shape to fill regions within digital shapes. However, these approaches cannot infer correlations between the missing surface and the observed surface. This functional rigidity results in generating inaccurate, unrealistic digital shapes.

Similarly, some conventional systems utilize data-drive techniques that implicitly learn a parametric shape space model. Such systems, however, generally cannot recover shape details due to limited training data and difficulty in synthesizing geometric styles that exhibit large topological and geometrical variations. Moreover, such systems are limited to low resolution by the cubic scaling of voxel counts. Accordingly, these rigid limitations result in digital shapes that are inaccurate and unrealistic.

Some conventional systems utilize complete point cloud completion that densify point clouds and refine local regions. However, as point clouds are sparse and unstructured, such systems have difficulty recovering fine-grained shape details. Moreover, such systems cannot recover topological data corresponding to 3D shapes.

Some systems complete two-dimensional images utilizing patch-based inpainting approaches. These two-dimensional models, however, are not able to operate in the three-dimensional domain. First, these systems utilize two-dimensional spatially-dense, continuous signals (e.g., pixel color) to determine matching patches. In contrast, three-dimensional shapes generally consist of sparse, near-binary signals (e.g., voxels representing occupancy). In addition, the number of voxels in a domain scales cubically with resolution (as opposed to quadratic scaling of pixels). This inherent difference in the three-dimensional domain limits the performance of algorithms, which cannot be transferred from 2D to 3D.

The disclosed shape completion system provides a number of advantages over conventional systems. For example, the shape completion system improves the flexibility and accuracy of computing devices that implement three-dimensional shape completion. In particular, the shape completion system generates a coarse completed 3D shape of an incomplete 3D digital shape and utilizes an encoder machine learning model to retrieve similar candidate 3D patches. The shape completion system then utilizes a trained machine learning model to intelligently determine transformations and blending weights for combining the candidate 3D patches. In this manner, the shape completion system preserves the style of local geometric features, even if it is drastically different from training data. Moreover, the shape completion system generates accurate completed 3D shapes, even with large missing regions in contexts that vary drastically from training samples.

Indeed, as outlined in greater detail below, researchers have conducted significant experiments with example embodiments of the shape completion system. Those experiments demonstrate, quantitively and qualitatively, that example embodiments of the shape completion system generate more accurate and realistic 3D shapes. Moreover, the experiments also demonstrate that the shape completion system works more accurately on novel categories that did not appear within training data sets. Furthermore, experiments illustrate that the shape completion system recovers geometry details even when only given a small area of reference patterns. Thus, the shape completion system can flexibly adapt to new contexts and sparse shape inputs to generate accurate complete 3D shape representations.

Turning now to the figures, FIG. 1 includes an embodiment of a system environment 100 in which a shape completion system 102 is implemented. In particular, the system environment 100 includes server device(s) 104 and a client device 106 in communication via a network 108. Moreover, as shown, the server device(s) 104 include a 3D content management system 110, which includes the shape completion system 102. FIG. 1 illustrates that the shape completion system 102 performs a patch retrieval 116 and a patch deformation and blending 118 utilizing various machine learning models to generate a complete 3D shape from an incomplete shape.

As used herein, the term "machine learning model" refers to a computer algorithm or a collection of computer algorithms that can be trained and/or tuned based on inputs to approximate unknown functions. For example, a machine learning model can include a computer algorithm with branches, weights, or parameters that change based on training data to improve for a particular task. Thus, a machine learning model can utilize one or more learning techniques to improve in accuracy and/or effectiveness. Example machine learning models include various types of decision trees, support vector machines, Bayesian networks, linear regressions, logistic regressions, random forest models, or neural networks (e.g., deep neural networks).

As used herein, the term "neural network" neural network includes a model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

As shown in FIG. 1, the server device(s) 104 includes or hosts the 3D content management system 110. The 3D content management system 110 includes, or is part of, one or more systems that implement modeling and rendering of objects and/or scenes in a digital, three-dimensional environment. For example, the 3D content management system 110 provides tools for viewing, generating, editing, and/or otherwise interacting with three-dimensional shapes within digital three-dimensional environments. To illustrate, the 3D content management system 110 communicates with the client device 106 via the network 108 to provide editing tools for display and interaction via the digital image application 114 at the client device 106.

The 3D content management system 110 uses the three-dimensional shapes in a variety of applications such as databases of three-dimensional assets, virtual or augmented reality environments, or other environments that utilize three-dimensional models. For example, as used herein, the term "three-dimensional shape" (or "3D shape") refers to a digital representation of an object in three dimensions. For example, a three-dimensional shape includes a geometric three-dimensional representation of an object, person, or thing. In some implementations, a three-dimensional shape includes collection of vertices, edges, and faces that define the shape of the object in three dimensions. Specifically, a three-dimensional mesh includes a number of vertices (or individual points) that connect to form edges, which then define faces representing a surface of the object.

Similarly, an "incomplete 3D digital shape" refers to an initial or input three-dimensional shape representation (e.g., that is missing one or more voxels or portions). For instance, an incomplete 3D digital shape can include a three-dimensional shape representation with an absent region (e.g., a region that has been excluded, improperly drafted, or not included). Thus, for example, an incomplete 3D digital shape includes a computer representation of a three-dimensional shape that is incompletely scanned or not completely drafted.

In some embodiments, the 3D content management system 110 receives interaction data for viewing, generating, or editing a three-dimensional shape from the client device 106, processes the interaction data (e.g., to view, generate, or edit a three-dimensional shape), and provides the results of the interaction data to the client device 106 for display via the digital image application 114 or to a third-party system. Additionally, in some embodiments, the 3D content management system 110 receives data from the client device 106 in connection with editing three-dimensional shapes, including requests to access three-dimensional shapes or digital source images stored at the server device(s) 104 (or at another device such as a source repository) and/or requests to store three-dimensional meshes from the client device 106 at the server device(s) 104 (or at another device).

In connection with providing tools for interacting with three-dimensional shapes, the 3D content management system 110 utilizes the shape completion system 102 to complete three-dimensional shapes. For example, the 3D content management system 110 obtains an incomplete three-dimensional shape (e.g., a scan or partially generated 3D shape) from the client device 106 or other system and uses the shape completion system 102 to generate a complete 3D shape. In particular, the shape completion system 102 utilizes machine learning models as part of the patch retrieval 116 and patch deformation and blending 118 to process the incomplete 3D digital shape and generate a complete 3D shape.

In one or more embodiments, in response to utilizing the shape completion system 102 to generate a complete 3D shape, the 3D content management system 110 provides the resulting complete 3D shape the client device 106 for display. A "complete 3D shape" refers to a three-dimensional shape with a portion or region that has been added or generated (e.g., relative to an incomplete 3D shape). Thus, a complete 3D shape, includes a computer representation of a three-dimensional shape where a missing portion or region has been filled in or completed (relative to an initial/incomplete 3D shape).

For instance, the 3D content management system 110 sends the complete 3D shape to the client device 106 via the network 108 for display via the digital image application 114. Additionally, in some embodiments, the client device 106 receives additional inputs to apply additional changes to the complete 3D shape (e.g., based on additional inputs to further modify the complete 3D shape). The client device 106 sends a request to apply the additional changes to the 3D content management system 110, and the 3D content management system 110 utilizes the shape completion system 102 to further modify the shape.

In one or more embodiments, the server device(s) 104 include a variety of computing devices, including those described below with reference to FIG. 20. For example, the server device(s) 104 includes one or more servers for storing and processing data associated with 3D shapes. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 20. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with a variety of digital content (e.g., 3D shapes in three-dimensional environments). In some embodiments, the client device 106 also performs functions for generating, capturing, or accessing data to provide to the 3D content management system 110 and the shape completion system 102 in connection with generating or editing 3D shapes. For example, the client device 106 communicates with the server device(s) 104 via the network 108 to provide information (e.g., user interactions) associated with 3D shapes. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 20.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the shape completion system 102 being implemented by a particular component and/or device within the system environment 100, the shape completion system 102 can be implemented, in whole or in part, by other computing devices and/or components in the system environment 100 (e.g., the client device 106).

In particular, in some implementations, the shape completion system 102 on the server device(s) 104 supports the shape completion system 102 on the client device 106. For instance, the server device(s) 104 generates the shape completion system 102 (including various machine learning models) for the client device 106. The server device(s) 104 trains and provides the shape completion system 102 and the machine learning models to the client device 106 for performing a shape completion process at the client device 106. In other words, the client device 106 obtains (e.g., downloads) the shape completion system 102 and the corresponding machine learning models from the server device(s) 104. At this point, the client device 106 is able to utilize the shape completion system 102 and the machine learning models to generate complete 3D shapes independently from the server device(s) 104.

In alternative embodiments, the shape completion system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to complete a 3D shape, and, in response, the shape completion system 102 or the 3D content management system 110 on the server device(s) 104 performs operations to generate completed 3D shapes. The server device(s) 104 provide the output or results of the operations to the client device 106.

Figure 2:
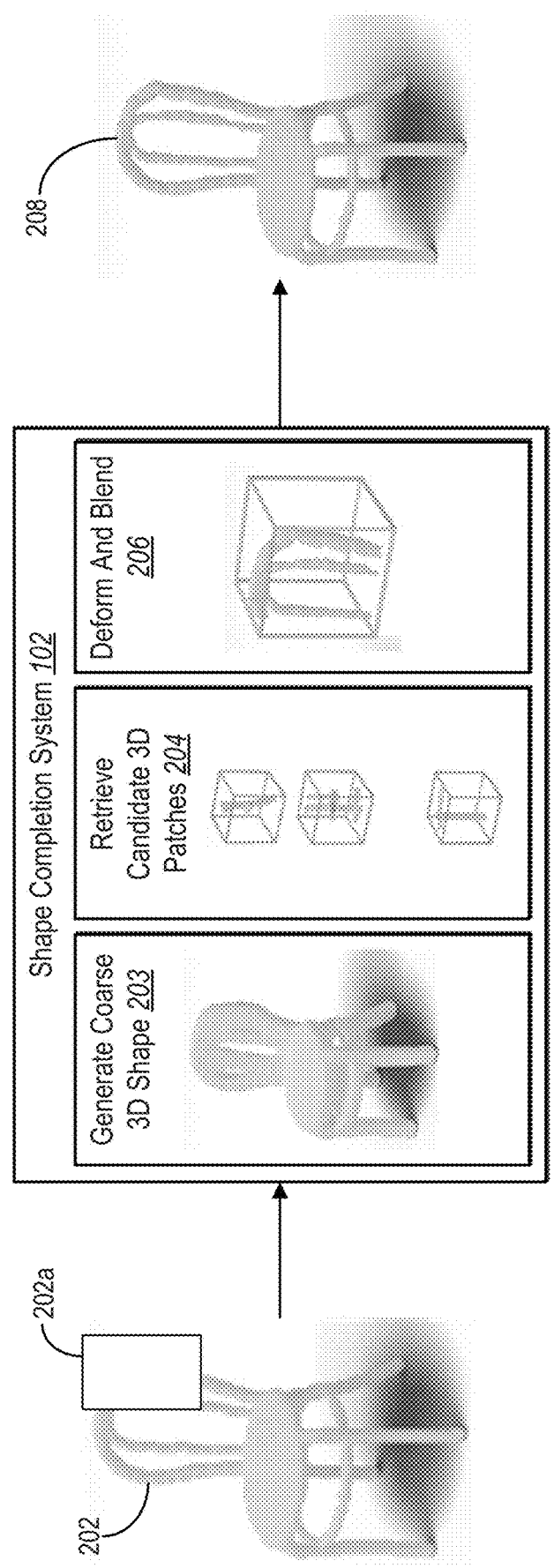
FIG. 2 illustrates a diagram of the shape completion system generating a transformed 3D digital shape in accordance with one or more implementations.

As mentioned, the shape completion system 102 generates complete 3D shapes from incomplete 3D digital shapes. FIG. 2 illustrates an overview of the shape completion system 102 generating a complete 3D shape in accordance with one or more embodiments.

In particular, FIG. 2 illustrates an incomplete 3D digital shape 202. For example, the incomplete 3D digital shape 202 can include a three-dimensional representation of an object or shape that is missing one or more component pieces (e.g., voxels). In some implementations, the shape completion system 102 receives, generates, or identifies the incomplete 3D digital shape 202. For instance, the shape completion system 102 can receive a scan of a three-dimensional object that is missing pieces or components. Similarly, the shape completion system 102 can identify a three-dimensional object generated via a three-dimensional object editing application that is not yet complete. Indeed, in relation to FIG. 2, the incomplete 3D digital shape 202 is missing components within the region 202a.

As illustrated, the shape completion system 102 analyzes the incomplete 3D digital shape 202 and generates a complete 3D shape 208. In particular, the shape completion system 102 performs an act 203 of generating a coarse 3D digital shape. In one or more implementations, the shape completion system 102 utilizes a machine learning model to generate a coarse 3D digital shape to provide a rough estimation of a completed shape relative to the incomplete 3D digital shape 202. For example, a coarse 3D digital shape can include a complete 3D shape at a lower resolution or level of detail than an initial 3D shape (e.g., than the incomplete 3D digital shape 202). Additional detail regarding generating a coarse 3D digital shape is provided below (e.g., in relation to FIG. 3).

As shown in FIG. 2, the shape completion system 102 also performs an act 204 of retrieving candidate 3D patches. A candidate 3D patch includes a portion of a 3D shape (e.g., analyzed to generate a complete 3D shape). Thus, for example, a candidate 3D patch includes a collection of voxels from an incomplete 3D digital shape (or another 3D shape) that are later combined to generate a complete 3D shape. In one or more embodiments, the shape completion system 102 analyzes coarse 3D patches of the coarse 3D digital shape and identifies candidate 3D patches corresponding to the coarse 3D patches.

A coarse 3D patch includes a portion of a coarse 3D digital shape. For instance, the shape completion system 102 can sample a coarse 3D patch within a patch region. A patch region refers to a three-dimensional volume defining an area or region. Thus, a patch region can include a three-dimensional volume (e.g., a cube, triangle, sphere, or other shape) that encompasses a coarse 3D digital shape. In some implementations, the shape completion system 102 determines a coarse 3D patch for the patch region and identifies candidate 3D patches for the patch region. For example, in some implementations, the shape completion system 102 samples coarse 3D patches and (for each coarse 3D patch) utilizes a trained encoder to identify a plurality of candidate 3D patches. Additional detail regarding retrieving candidate 3D patches is provided below (e.g., in relation to FIG. 4).

In addition, as illustrated in FIG. 2 the shape completion system 102 also performs an act 206 of determining and blending the candidate 3D patches. In particular, the shape completion system 102 can identify a sub-volume and blend candidate 3D patches within the sub-volume according to transformation and blending weights. A sub-volume refers to a three-dimensional region defining or encompassing a portion of a 3D shape. Thus, for example a sub-volume can include a region or area corresponding to a portion of an incomplete 3D digital shape and/or a portion of a complete 3D shape.

In one or more implementations, the shape completion system 102 utilizes a blending-deformation machine learning model to generate blending weights and transformations for candidate 3D patches within a sub-volume. The shape completion system 102 then utilizes the blending weights and transformations to blend the candidate 3D patches into a transformed sub-volume. Additional detail regarding deforming and blending candidate 3D patches is provided below (e.g., in relation to FIG. 5).

In one or more implementations, the shape completion system 102 then combines different sub-volumes to generate a complete 3D shape. Indeed, in relation to FIG. 2, the shape completion system 102 combines candidate 3D patches into sub-volumes and then combines the sub-volumes to generate the complete 3D shape 208.

For example, in one or more implementations, the shape completion system 102 receives an incomplete or a partial shape S as input and completes it into a full detailed shape Ŝ. The shape completion system 102 extracts local regions, referred to as candidate 3D patches, from the given incomplete shape S, and uses them to complete and output a full complete shape. In order to analyze and synthesize topologically diverse data using convolutional architectures, the shape completion system represents shapes and patches as voxel grids with occupancy values, at a resolution of $s_{shape}$ cells. The shape completion system chooses patches from the partial input then deforms and blends them into a seamless, complete detailed output. In particular, the shape completion system utilizes a three-stage pipeline: (i) complete the partial input to get a coarse complete structure C to guide detail completion; (ii) for each completed coarse patch in C, retrieve candidate detailed patches from the input shape S; (iii) deform and blend the retrieved detailed patches to output the complete detailed shape Ŝ. Additional detail regarding the stages of this pipeline is provided in the following figures.

Figure 3:
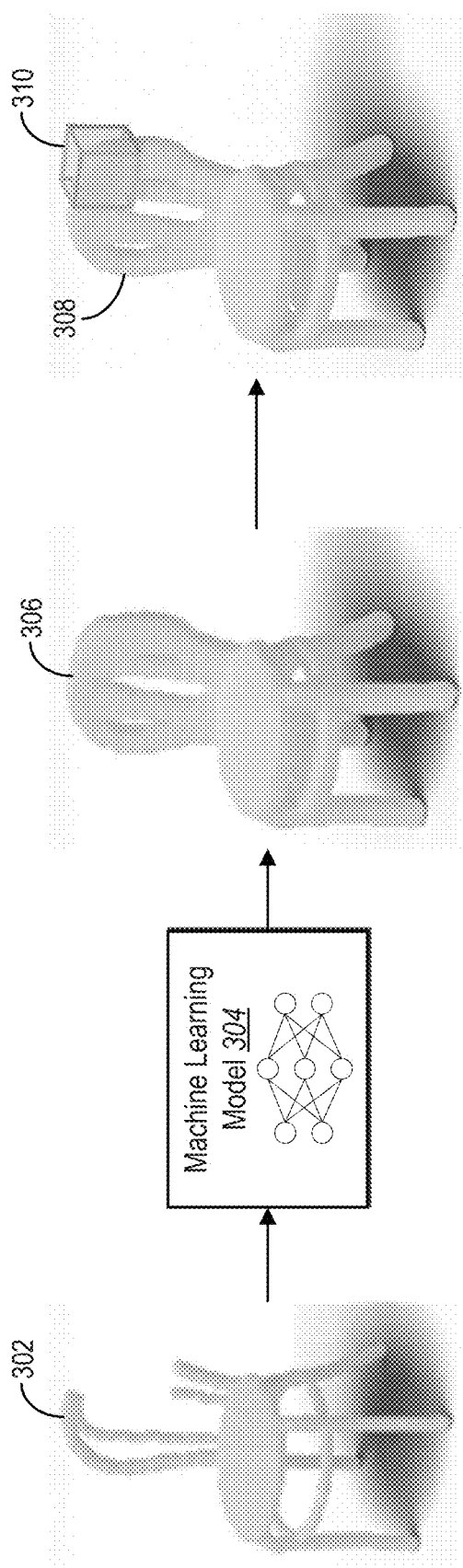
FIG. 3 illustrates a diagram of an overview of the shape completion system generating a coarse 3D digital shape from an incomplete 3D digital shape utilizing a machine learning model and sampling a coarse 3D patch from the coarse 3D digital shape in accordance with one or more embodiments.

As just mentioned, in one or more implementations, the shape completion system 102 utilizes a machine learning model to generate a coarse 3D digital shape from an incomplete 3D digital shape. Moreover, the shape completion system 102 then samples coarse 3D patches from the coarse 3D digital shape. For example, FIG. 3 illustrates generating a coarse 3D digital shape 306 from an incomplete 3D digital shape 302 utilizing a machine learning model 304 and then sampling a coarse 3D patch 310 from the coarse 3D digital shape.

As shown, the shape completion system 102 utilizes the machine learning model 304 to analyze the incomplete 3D digital shape 302 and generate a coarse 3D digital shape 306. The shape completion system 102 can utilize a variety of architectures for the machine learning model 304. In one or more implementations, the shape completion system 102 utilizes a 3D-convolutional neural network. In other implementations, the shape completion system 102 utilizes other machine learning model approaches. In one or more embodiments, the shape completion system 102 utilizes the particular architecture described below in relation to FIG. 9.

The shape completion system 102 utilizes the machine learning model 304 to generate the coarse 3D digital shape 306. As shown, the coarse 3D digital shape 306 is less defined and precise than the incomplete 3D digital shape, but includes an estimate of the complete shape. Indeed, the coarse 3D digital shape 306 has a lower resolution (e.g., fewer voxels per unit volume) than the incomplete 3D digital shape 302. Thus, the coarse 3D digital shape 306 includes a full or complete coarse 3D shape (at a down-sampled, lower resolution) relative to the incomplete 3D digital shape 302.

In sum, the shape completion system 102 generates a full coarse shape C from the partial input S using a 3D-CNN architecture. The shape completion system 102 thus generates a bounding-volume type of approximations of the underlying ground truth, but without the local geometric details.

As shown, the shape completion system 102 can sample coarse 3D patches from the coarse 3D digital shape 302. Indeed, FIG. 3 illustrates a coarse 3D patch 310 within a patch region. In one or more implementations, the shape completion system 102 repeatedly samples the coarse 3D digital shape 302 for coarse 3D patches. Moreover, for each coarse 3D patch, the shape completion system 102 identifies candidate 3D patches. Thus, the coarse 3D digital shape 308 (and corresponding coarse 3D patches) serve as a guide to identify geometrically similar shapes in filling missing regions of the incomplete 3D digital shape 302.

Figure 4:
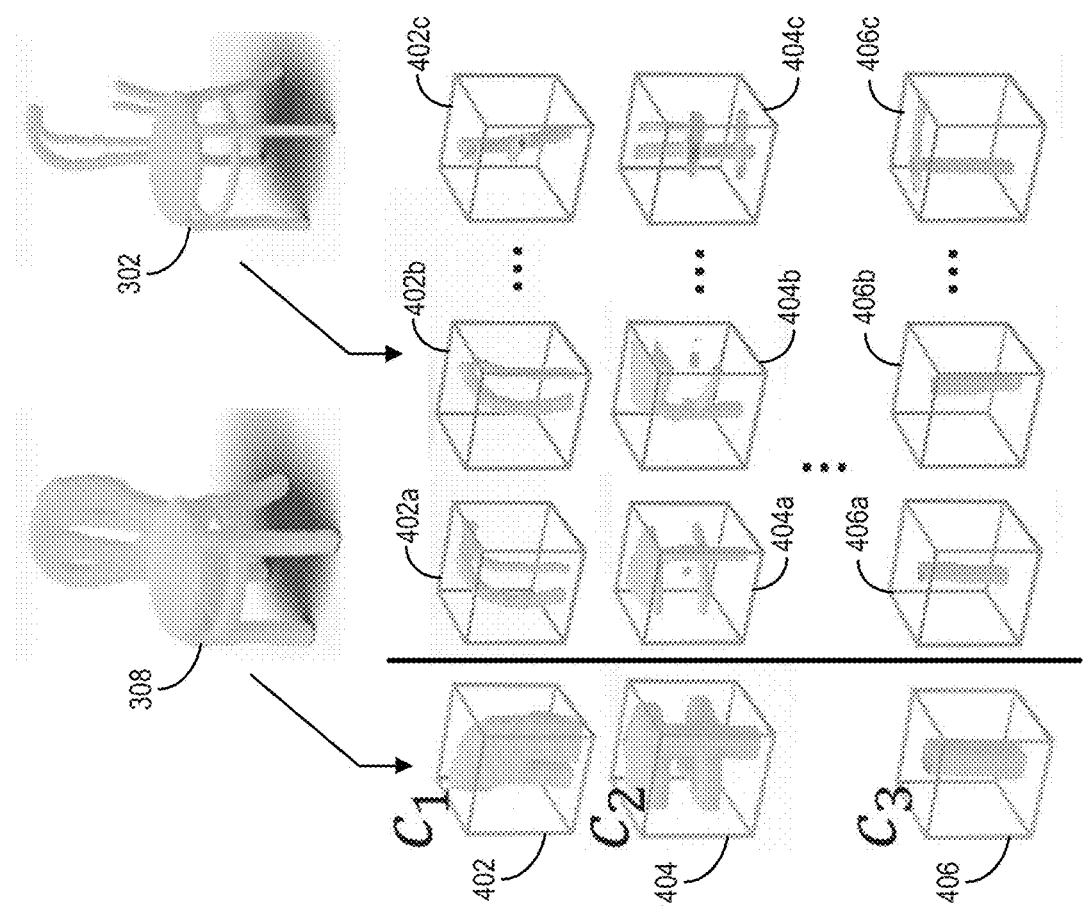
FIG. 4 illustrates a diagram of the shape completion system retrieving candidate 3D patches from an incomplete 3D digital shape based on coarse 3D patches in accordance with one or more implementations.

For example, FIG. 4 illustrates the shape completion system 102 sampling a plurality of coarse 3D patches 402-406 (also labeled $c_1$, $c_2$, and $c_3$ for later reference) from the coarse 3D digital shape 308. The shape completion system 102 can utilize a variety of sampling approaches. In one or more implementations, the shape completion system 102 iteratively samples across the entire coarse 3D digital shape 308 at a stride interval (e.g., taking a sample every n voxels). In other implementations, the shape completion system 102 samples coarse 3D patches utilizing random sampling. In some circumstances, the shape completion system 102 compares the coarse 3D digital shape 308 and the incomplete 3D digital shape 302 to identify regions of change. The shape completion system 102 then samples based on the regions of change (e.g., samples utilizing a probability distribution defined based on a degree of change across the area defined by the incomplete 3D digital shape and/or the coarse 3D digital shape).

As shown in FIG. 4, the shape completion system 102 also retrieves candidate 3D patches corresponding to the coarse 3D patches 402-406. In particular, the shape completion system 102 retrieves candidate 3D patches 402a-402c corresponding to the coarse 3D patch 402. Similarly, the shape completion system 102 retrieves candidate 3D patches 404a-404c corresponding to the coarse 3D patch 404 and retrieves candidate 3D patches 406a-406c corresponding to the coarse 3D patch 406.

In relation to FIG. 4, the shape completion system 102 retrieves candidate 3D patches from the incomplete 3D digital shape 302. In particular, the shape completion system 102 searches the incomplete 3D digital shape 302 for candidate 3D patches that are geometrically similar to the coarse 3D patches. Thus, for instance, the shape completion system 102 searches the incomplete 3D digital shape for candidate 3D patches that are similar to the coarse 3D patch 402 and identifies the candidate 3D patches 402a-402c.

In some embodiments, the shape completion system 102 samples candidate 3D patches from different 3D shapes (e.g., shapes other than the incomplete 3D digital shape 302). For example, the shape completion system 102 can access a repository of candidate 3D shapes and retrieve candidate 3D patches from the repository of candidate 3D shapes. In this manner, the shape completion system 102 can fill a missing region with geometries that may not be found within the incomplete 3D digital shape 302.

In one or more implementations the shape completion system 102 utilizes a trained machine learning model to conduct this search. For example, the shape completion system 102 utilizes one or more encoder machine learning models (e.g., an encoder neural network) to project patches into a feature space where distance in the feature space reflects geometrically similarity. For example, in some embodiments, the shape completion system 102 utilizes a first encoder to project coarse 3D patches to the feature space and utilizes a second encoder to project candidate 3D patches to the feature space.

Figure 5:
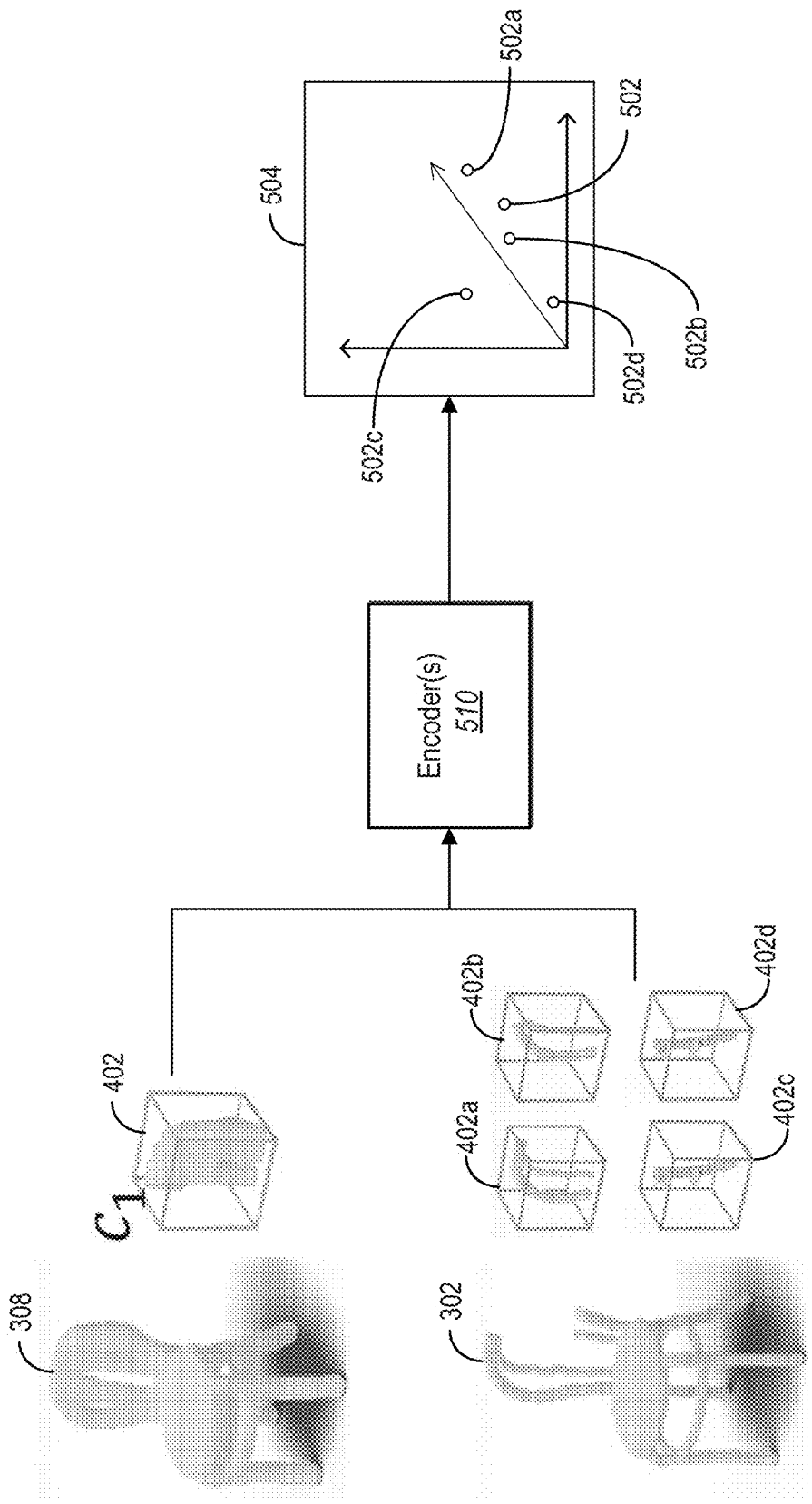
FIG. 5 illustrates a diagram of the shape completion system retrieving candidate 3D patches by utilizing an encoder to generate candidate 3D encodings and coarse 3D patch encodings in accordance with one or more implementations.

For example, FIG. 5 illustrates the shape completion system 102 utilizing encoder(s) 510 to project patches into a feature space 504. Specifically, FIG. 5 illustrates the shape completion system 102 analyzing the coarse 3D patch 402 and candidate 3D patches 402a-402d. The shape completion system 102 utilizes the encoder(s) 510 to generate a coarse 3D patch encoding 502 in the feature space 504 from the coarse 3D patch 402. Moreover, the shape completion system 102 utilizes the encoder(s) 510 to generate candidate 3D patch encodings 502a-502d in the feature space 504 from the candidate 3D patches 402a-402d.

The encoder(s) 510 can include a variety of machine learning model architectures. As mentioned above, in one or more implementations the shape completion system 102 utilizes neural networks for the encoder(s) 510. For example, the shape completion system 102 can utilize the neural network architecture described in relation to FIG. 10. In other embodiments, the shape completion system 102 can utilize other encoder models. As mentioned above, in one or more implementations, the shape completion system 102 trains and utilizes separate encoders for coarse 3D patches and candidate 3D patches.

As discussed, the shape completion system 102 can train the encoder(s) 510 so that distances between the encodings within the feature space 504 reflect geometric distance (agnostic to transformations) between the patches. Thus, for example, in relation to FIG. 5 the candidate 3D patch encoding 502b is closest to the coarse 3D patch encoding 502 within the feature space 504 (e.g., that the embedding distance between the two is smallest within the feature space). This indicates that the candidate 3D patch encoding 502b is most geometrically similar to the 3D patch encoding 502. This geometric similarity measure accounts for transformations of the various patches. In particular, the shape completion system 102 trains the encoder(s) 510 to consider variations across rigid transformations so that the distance/geometric similarity within the feature space 504 is not tied to a particular orientation, size, or other transformation of the patches. Additional detail regarding training the encoder(s) 510 is provided below (e.g., in relation to FIG. 7).

The shape completion system 102 utilizes encodings within the feature space 504 to select a set of candidate 3D patches utilized to generate a complete 3D shape. For example, in some embodiments, the shape completion system 102 selects the top-k candidate 3D patches based on distance in the feature space 504 relative to the coarse 3D patch encoding 502. In relation to FIG. 5, the shape completion system 102 selects the top 3 candidate 3D patches. The candidate 3D patch encoding 502d is farthest from the candidate 3D patch encoding 502. Accordingly, the shape completion system 102 does not select the candidate 3D patch 402d in the set of candidate 3D patches utilizes to generate a complete 3D shape. The shape completion system 102 can select a variety of numbers of candidate 3D patches (e.g., 5 or 10) for each coarse 3D patch.

Although FIG. 5 illustrates selecting candidate 3D patches for a single coarse 3D patch, the shape completion system 102 can select candidate 3D patches for a variety of coarse 3D patches. For example, in some implementations, the shape completion system 102 selects candidate 3D patches for each sampled coarse 3D patch. Moreover, although FIG. 5 illustrates analyzing four candidate 3D patches, the shape completion system 102 can analyze a different of numbers of candidate 3D patches. In some implementations, the shape completion system 102 analyzes candidate 3D patches by iterating at a certain stride across the entire incomplete 3D digital shape 302. Thus, the shape completion system 102 can analyze hundreds (or thousands) of candidate 3D patches and retrieve the top-k candidate 3D patches for each coarse 3D patch based on distances within the feature space 504.

Stated differently, the shape completion system 102 analyzes the partial detailed shape S, and a coarse and completed version of the shape, C. The shape completion system 102 then retrieves a set of patch candidates that can be deformed and stitched to get a fully detailed shape. In one or more embodiments, a patch indicates a portion of a shape extracted from within a cube-shaped sub-region (e.g., a patch region) composed of $s_{patch}^3$ voxels. The shape completion system 102 utilizes a sampling process P that takes a shape as input and outputs a collection of patches, where coarse 3D patches P(C) serve as queries and detailed patches from the partial input P(S) as sources.

In one or more embodiments, the shape completion system 102 trains another neural network to retrieve k candidate detailed patches from S for each coarse patch in C. Namely, the shape completion system 102 learns geometric similarity, defined by a rigid-transformation-invariant distance d, between the coarse and detailed patches.

Upon retrieving candidate 3D patches for coarse 3D patches, in one or more embodiments, the shape completion system 102 utilizes the candidate 3D patches to generate a complete 3D shape. In particular, the shape completion system 102 utilizes a blending-deformation machine learning model to predict transformations and blending weights utilized to combine candidate 3D patches to generate a complete 3D shape. For example, FIG. 6 illustrates utilizing a blending-deformation machine learning model 610 to generate transformations 612-616 and blending weights 618-622 utilized to generate a complete 3D shape 630.

Figure 6:
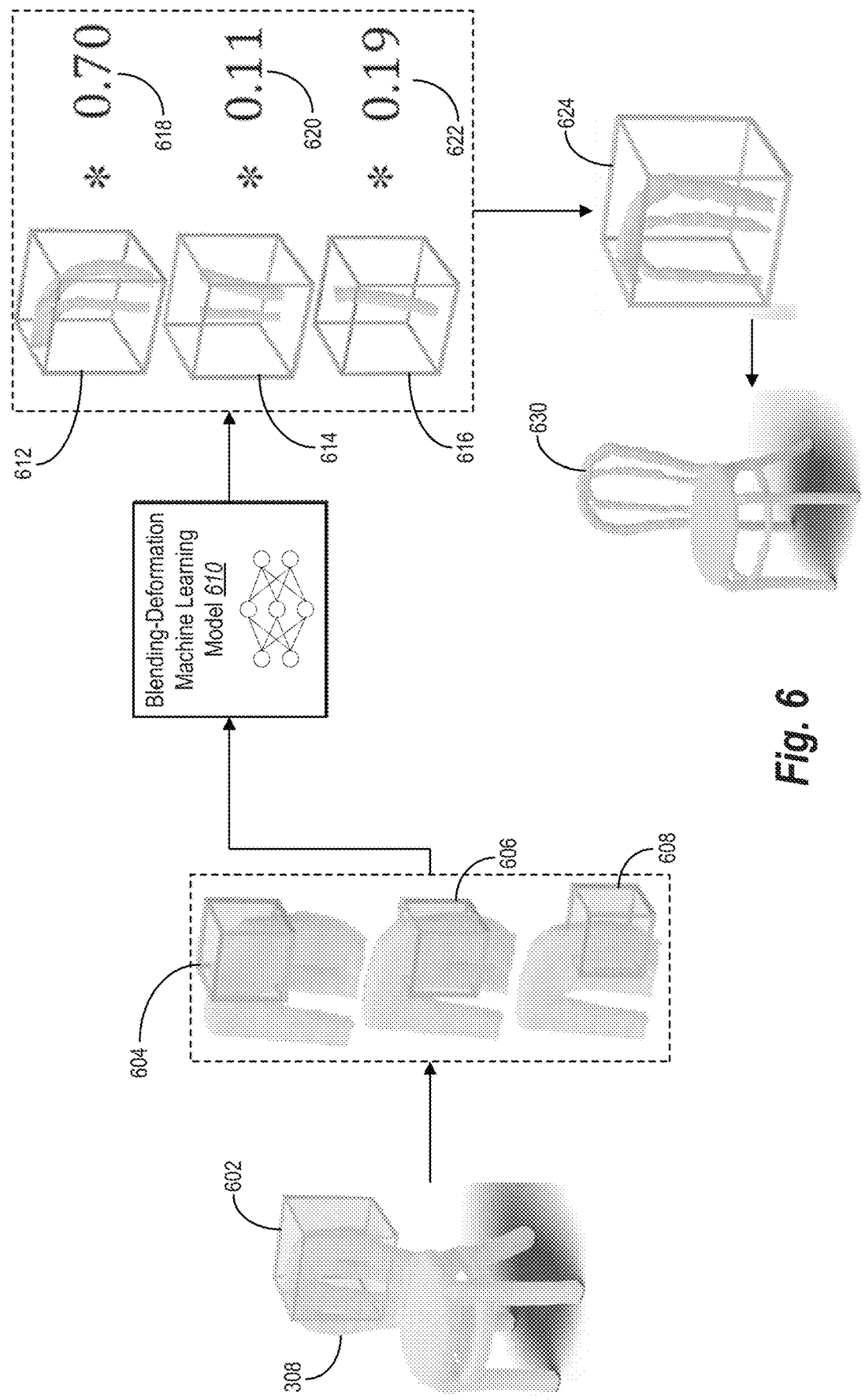
FIG. 6 illustrates a diagram of the shape completion system generating a transformed 3D digital shape by combining candidate 3D patches utilizing transformations and blending weights in accordance with one or more implementations.

In particular, FIG. 6 illustrates the shape completion system 102 analyzing a sub-volume 602 of the coarse 3D digital shape 308. The shape completion system 102 samples the sub-volume 602 and analyzes coarse 3D patches 604-608 for patch regions that fall within the sub-volume 602. In particular, for each of the coarse 3D patches 604-608, the shape completion system 102 identifies candidate 3D patches (as described above in relation to FIG. 5). Specifically, the shape completion system 102 identifies k candidate 3D patches for the coarse 3D patches and determines transformations and blending weights for each candidate 3D patch.

Specifically, the shape completion system 102 analyzed candidate 3D patches corresponding to the coarse 3D patches 604-608 utilizing the blending-deformation machine earning model 610. The blending-deformation machine learning model 610 generates a transformation and blending weight for each candidate 3D patch. Thus, for example, FIG. 6 illustrates the shape completion system 102 utilizing the blending-deformation machine learning model 610 to generate the transformations 612-616 and the blending weights 618-622.

The shape completion system 102 can utilize blending-deformation machine learning models having a variety of architectures. For example, in some implementations the shape completion system 102 utilizes a blending-deformation neural network (e.g., a convolutional neural network). In some implementations, the shape completion system 102 utilizes a blending-deformation machine learning model having the architecture illustrated in relation to FIG. 11. The shape completion system 102 can utilize a variety of other blending-deformation models.

As mentioned, the blending-deformation machine learning model can generate the transformations 612-616. A "transformation" refers to a deformation of a three-dimensional representation. Thus, for example, a transformation can include re-sizing, translating, rotating, mirroring, or scaling. A transformation can include a variety of rigid transformations that modify the orientation, size, or arrangement of a three-dimensional representation (e.g., a candidate 3D patch).

Thus, in relation to FIG. 6, the shape completion system 102 identifies transformations 612-616 corresponding to candidate 3D patches. For example, the transformation 612 can include a scaling of a candidate 3D patch (e.g., a candidate 3D patch corresponding to the coarse 3D patch 604). Similarly, the transformation 614 can include a rotation and/or scaling of a candidate 3D patch (e.g., a candidate patch corresponding to the coarse 3D patch 606).

In addition, the shape completion system 102 also utilizes the blending-deformation machine learning model 610 to generate blending weights 618-622. For example, the blending weights 618-622 indicate a measure of emphasis or significance of a particular candidate 3D patch. For example, a candidate 3D patch with a high similarity to a coarse 3D patch may have a higher blending weight than a candidate 3D patch with a low similarity to a coarse 3D patch.

As shown, the shape completion system 102 utilizes the transformations 612-616 and the blending weights 618-622 to generate a complete 3D shape 630. In particular, for the sub-volume 602, the shape completion system 102 applies the transformations 612-616 to candidate 3D patches to generate transformed candidate 3D patches. The shape completion system 102 then applies the blending weights to the transformed candidate 3D patches (e.g., through a multiplication, division, exponential, or logarithmic operation). This results in a transformed sub-volume 624 (e.g., from the sub-volume 602) that includes a combined three-dimensional representation from the candidate 3D patches.

In one or more implementations, the shape completion system 102 utilizes the transformed sub-volume 624 to generate the complete 3D shape 630. For example, in one or more implementations, the shape completion system 102 repeats the process illustrated in FIG. 6 to generate a plurality of transformed sub-volumes. The shape completion system 102 can combine the plurality of sub-volumes to generate the complete 3D shape 630. For example, the shape completion system 102 can add (or stich) sub-volumes together. In some implementations, the shape completion system 102 samples sub-volumes at a particular stride, identifies an overlap region between sub-volumes, and perform an averaging (or other combination) of different transformed sub-volumes within the overlap region to generate the complete 3D shape 360.

Although FIG. 6 illustrates combining candidate 3D patches within a sub-volume, the shape completion system 102 need not divide this process into a sub-volume analysis. For example, in some implementations, the shape completion system 102 generates transformations and blending weights for candidate 3D patches (e.g., for the entire shape) and combines the candidate 3D patches for the entire shape (e.g., without a per-sub-volume analysis).

Moreover, although FIG. 6 illustrates three transformations and three blending weights corresponding to three coarse 3D patches, it will be appreciated that the number of candidate 3D patches, transformations, and blending weights can differ from the number of coarse 3D patches. Indeed, as described above, in some implementations, the shape completion system 102 generates a plurality of candidate 3D patches for each coarse 3D patch. The shape completion system 102 can generate transformations and blending weights for each candidate 3D patch.

Thus, the shape completion system 102 can identify a first plurality of candidate 3D patches for a first coarse 3D patch and a second plurality of candidate 3D patches for a second coarse 3D patch. The shape completion system 102 can utilize the blending-deformation machine learning model 610 to generate transformation and blending weights for the first plurality of candidate 3D patches and the second plurality of candidate 3D patches.

In addition, although FIG. 6 illustrates a single blending-deformation machine learning model 610, the shape completion system 102 can also implement multiple models. For example, the shape completion system 102 can utilize a first model to generate transformations and a second model to generate blending weights. Indeed, in some implementations, the shape completion system 102 utilizes different models or models with multiple heads that generate different outputs. Thus, as used herein, the term blending-deformation machine learning model encompasses a single model or multiple models for generating transformations/blending weights.

Stated differently, in one or more implementations, given k candidate patches, the shape completion system 102 uses a neural network to predict rigid transformations and blending weights for each candidate patch, which together define a deformation and blending of patches that yields a globally-consistent, plausible shape completion.

The input to this stage, in one or more implementations, is the coarse shape C, partial input S, and the retrieval candidates. The output is the full detailed shape Ŝ, produced by deforming and blending the retrieved patches. The shape completion system 102 first applies a rigid transformation to each retrieved patch and then blends these transformed patches into the final shape. In one or more implementations, the shape completion system 102 blends according to a partition-of-unity process, which blends candidate patches with optimized transformations into a smooth completion.

Unlike using fixed weighting functions, in one or more embodiments, the shape completion system 102 learns the blending weights. These weights serve the role of selecting candidate patches and stitching them smoothly. In some implementations, the shape completion system 102 learns the blending weights from some context (e.g., a few neighboring patches), but does not require understanding the whole shape (coarse shape and retrieved patches already constrain the global structure). Thus, to improve efficiency and generalizability, the shape completion system 102 can perform deformation and blending at the meso-scale of sub-volumes $V \subset S$ with size $s_{subv}$.

Given a sub-volume V the shape completion system 102 identifies $[r_m, m=1 \ldots M]$ an ordered list of M best patches to be considered for blending. The shape completion system 102 retrieves these patches from the retrieved candidates $R_l$ such that $l \in V$, and sorted according to two criteria: (i) retrieval index, (ii) x; y; z ordering. If more than M such patches exist, the shape completion system 102 takes the first M. Each patch $r_m$ is transformed with a rigid motion and possible reflection, $T_m$, and the shape completion system 102 determines a blending weight, $\omega_m |x|$, for each patch at every point x in the volume. The shape completion system 102 generates an output at voxel x the weighted sum of the deformed blending candidates:

$$V|x| = \frac{1}{\xi|x|} \sum_{m=1\ldots M} \omega_m|x| \cdot T_m(r_m)|x|$$

where $\omega_m|x|$ is the blending weight for patch m at voxel x, and $T_m(r_m)$ is the transformed patch (placed in the volume V, and padded with 0), and $\xi|x| = \Sigma_{m=1 \ldots M} \omega_m|x|$ is the normalization factor. At inference time, the shape completion system 102 reconstructs the entire shape, and samples V over the entire domain Ŝ (with stride $\gamma_{subv}$), and average values in the region of overlap.

Figure 7:
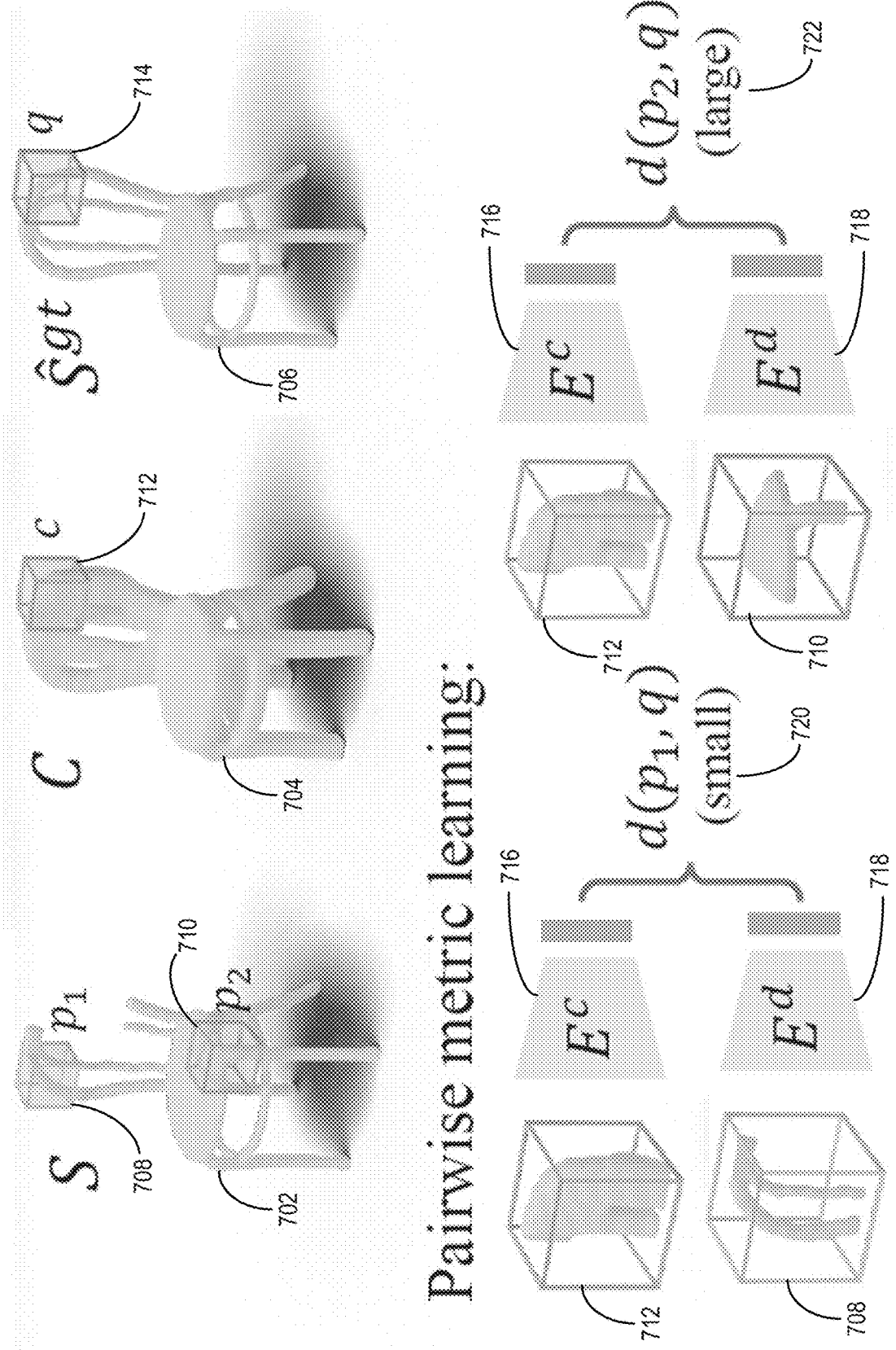
FIG. 7 illustrates a diagram of the shape completion system learning parameters of an encoder in accordance with one or more implementations.

As mentioned previously, in one or more implementations, the shape completion system 102 also trains various machine learning models. For example, FIG. 7 illustrates training encoder machine learning models in accordance with one or more embodiments. Specifically, FIG. 7 illustrates utilizing pairwise metric learning to train a first encoder 716 (e.g., a coarse encoder) and a second encoder 718 (e.g., a detailed encoder).

As illustrated, the shape completion system 102 identifies an incomplete/detailed 3D digital shape 702. The shape completion system 102 also identifies (e.g., generates as described in relation to FIG. 3) a coarse 3D digital shape 712 corresponding to the incomplete 3D digital shape 702. Furthermore, the shape completion system 102 identifies a ground truth complete shape 706.

As illustrated, the shape completion system 102 trains the first encoder 716 and the second encoder 718 utilizing pairwise metric learning. For example, the shape completion system 102 samples a first, coarse 3D sample 712 from the coarse 3D digital shape 704. The shape completion system 102 also samples a second, detailed 3D sample 708 from the incomplete 3D digital shape 702. The shape completion system 102 utilizes the first encoder 716 to generate a coarse encoding for the coarse 3D sample 712. The shape completion system 102 utilizes the second encoder 718 to generate a detailed encoding for the detailed 3D sample 708.

As shown, the shape completion system 102 also determines a geometric distance 720. In particular, the shape completion system 102 determines a geometric distance between a ground truth 3D sample 714 from the ground truth 3D shape and the second (detailed) 3D sample 708. In one or more embodiments, the shape completion system 102 determines this distance by comparing geometric similarity (i.e., a distance metric) between two samples. For example, the shape completion system 102 can explore the transformation space for the two samples and identify a distance metric (e.g., a measure of similarity, dissimilarity, or distance between two geometries). In one or more implementations, the shape completion system 102 identifies the transformation with the lowest/nearest distance metrics, and utilizes this distance as the geometric distance between the two shapes. Accordingly, the shape completion system 102 can utilize a geometric distance that is agnostic to transformations. Indeed, by analyzing distance metrics across combinations of transformations between two samples, the shape completion system 102 can determine a geometric distance that reflects geometric similarity, regardless of a current transformation.

In one or more implementations, the shape completion system 102 utilizes the geometric distance 720 as a ground truth distance to train the encoders 716, 718 to more accurate map samples within a feature space. To illustrate, the shape completion system 102 determines a ground truth geometric distance between the coarse 3D sample 712 and the detailed 3D sample 708. The shape completion system 102 also determines an embedding distance between a coarse encoding for the coarse 3D sample 712 and the detailed encoding for the detailed 3D sample 708 within a feature space. The shape completion system 102 compares the ground truth distance and the embedding distance (e.g., feature space distance) and trains the encoders 716, 718 based on the comparison.

For example, the shape completion system 102 can compare a difference between the ground truth distance and the embedding distance and utilize the difference as a measure of loss. The shape completion system 102 can then modify internal weights/parameters of the encoders 716, 718 based on the measure of loss. For example, the shape completion system 102 can utilize gradient descent and/or backpropagation to modify layer weights of the encoders 716, 718 so that the feature space distance is closer to the ground truth distance for a particular sample pair.

As illustrated, the shape completion system 102 can repeatedly identify sample pairs in training the encoders 716, 718. In particular, in some implementations the shape completion system 102 selects sample 3D pairs to more efficiently train the encoders 716, 718. For example, the shape completion system 102 selects the 3D sample 708 as a positive sample because it matches the coarse 3D sample 712 and/or the ground truth 3D sample 714. Thus, the shape completion system 102 can identify positive samples with a small geometric difference. The shape completion system 102 can also select negative samples (e.g., with a large geometric difference).

For example, FIG. 7 illustrates the shape completion system 102 selecting an additional 3D sample 710. The additional 3D sample 710 is geometrically different than the coarse 3D sample 712 and the ground truth 3D sample 714. The shape completion system 102 implements a similar process, and utilizes the first encoder 716 to generate a coarse encoding for the coarse 3D sample 712. Similarly, the shape completion system 102 utilizes the second encoder 718 to generate an additional detailed encoding for the additional 3D sample 710. The shape completion system 102 then determines an embedding distance between the coarse encoding and the detailed encoding within the feature space.

The shape completion system 102 determines a ground truth geometric distance 722 between the ground truth 3D sample 714 and the additional 3D sample 710. Moreover, the shape completion system 102 compares the ground truth geometric distance 722 to the feature space distance and modifies parameters of the encoders 716, 718. Specifically, if the ground truth geometric distance 722 is large, the shape completion system 102 trains the encoders 716, 718 to increase the embedding distance for the sample pair within the feature space. In this manner, the shape completion system 102 trains the encoders 716, 718 to generate encodings that are close in feature space for geometrically similar samples and generate encodings that are far in feature space for geometrically dissimilar samples.

To elaborate, the shape completion system 102 defines a measure of geometric distance, d, between two detailed shape patches ($p_1$; $p_2$). In one or more embodiments, this metric is agnostic to their poses, because the pose can be fixed at the deformation stage. Accordingly, in some implementations the shape completion system 102 defines the distance as the minimum over all possible rigid transformations of the patch, in the following Equation 1:

$$d(p_1, p_2) = \min_T \frac{\|T(p_1) - p_2\|_1}{\|T(p_1)\|_1 + \|p_2\|_1}$$

where T is a rigid motion composed with a possible reflection, i.e., T=(R, t, f), where $R \in SO(3)$ is the rotation, $t \in \mathbb{R}^3$ is the translation, $f \in \{0,1\}$ denotes if a reflection is applied, and $\|\cdot\|_1$ denotes the L1 norm of distances of closest point pairs or norms of positional vectors to patch centers. To practically compute this distance, in one or more embodiments the shape completion system 102 runs an ICP (iterative closest point algorithm) as described by Paul J. Besl and Neil D. McKay. A method for registration of 3-d shapes. IEEE Trans. Pattern Anal. Mach. Intell., 14(2):239-256, 1992, which is incorporated by reference herein in its entirety. In particular, the shape completion system 102 runs an ICP initialized from two transformations (with and without reflection enabled) that align patch centers. While this geometric distance can be computed for detailed patches, at inference time the shape completion system 102 has coarse patches. Therefore, the shape completion system 102 trains a network to embed coarse patches into a latent space in which Euclidean distances match the geometric distances of the detailed patches they represent.

In one or more embodiments, the shape completion system 102 trains two neural networks to act as encoders, one for coarse patches and one for detailed patches, $E^c$ and $E^d$, respectively. The shape completion system 102 trains these encoders such that the Euclidean distances between their generated codes reflect the distances between the true detailed patches observed during training. Given a coarse patch $c \in P(C)$ with its true corresponding detailed patch $q \in P(\hat{S}^{gt})$, as well as another detailed patch $p \in P(S)$, the shape completion system 102 defines a metric embedding loss:

$$L_r = \sum_{(c,p,q) \in \tau} \left\| \|E^c(c) - E^d(p)\|_2 - d(p, q) \right\|_2$$

where d(p, q) is the geometric distance defined in Equation 1. The shape completion system 102 utilizes training triplets composed of true matches and random patches: $\tau = \tau_{true} \cup \tau_{rnd}$. Where in both sets c is a random coarse patch, q is the corresponding true detailed patch. In some implementations, the shape completion system 102 set p=q for $\tau_{true}$. Similarly, the shape completion system 102 randomly samples $p \in P(S)$ for $\tau_{rnd}$.

As discussed, upon training the encoder networks the shape completion system 102 uses them at inference time to retrieve detailed patches for each coarse patch. First, the shape completion system 102 encodes the detailed patches in P(S) via $E^d$. Similarly, for each non-empty coarse patch $c \in P(C)$ with lowest corner at location l, the shape completion system 102 encodes it with $E^c$ and find the K-nearest-neighbor detailed codes. The shape completion system 102 stores the list of retrieved patches for each location, denoted as $R_l$ (as mentioned above). The shape completion system 102 samples the coarse patches using a fixed-size ($s_{patch}^3$) sliding window with a stride patch $\gamma_{patch}$. Note that, in one or more embodiments, the shape completion system 102 does not assume/know which parts of the detailed shape need to be completed. In one or more implementations, because the feature learning step observes a lot of positive coarse/fine pairs with the detailed input, the input is naturally reconstructed from the retrieved detailed patches.

In addition to training an encoder machine learning model, the shape completion system 102 can also train a blending-deformation machine learning model. For example, FIG. 8 illustrates training a blending-deformation machine learning model 808 in accordance with one or more embodiments.

Figure 8:
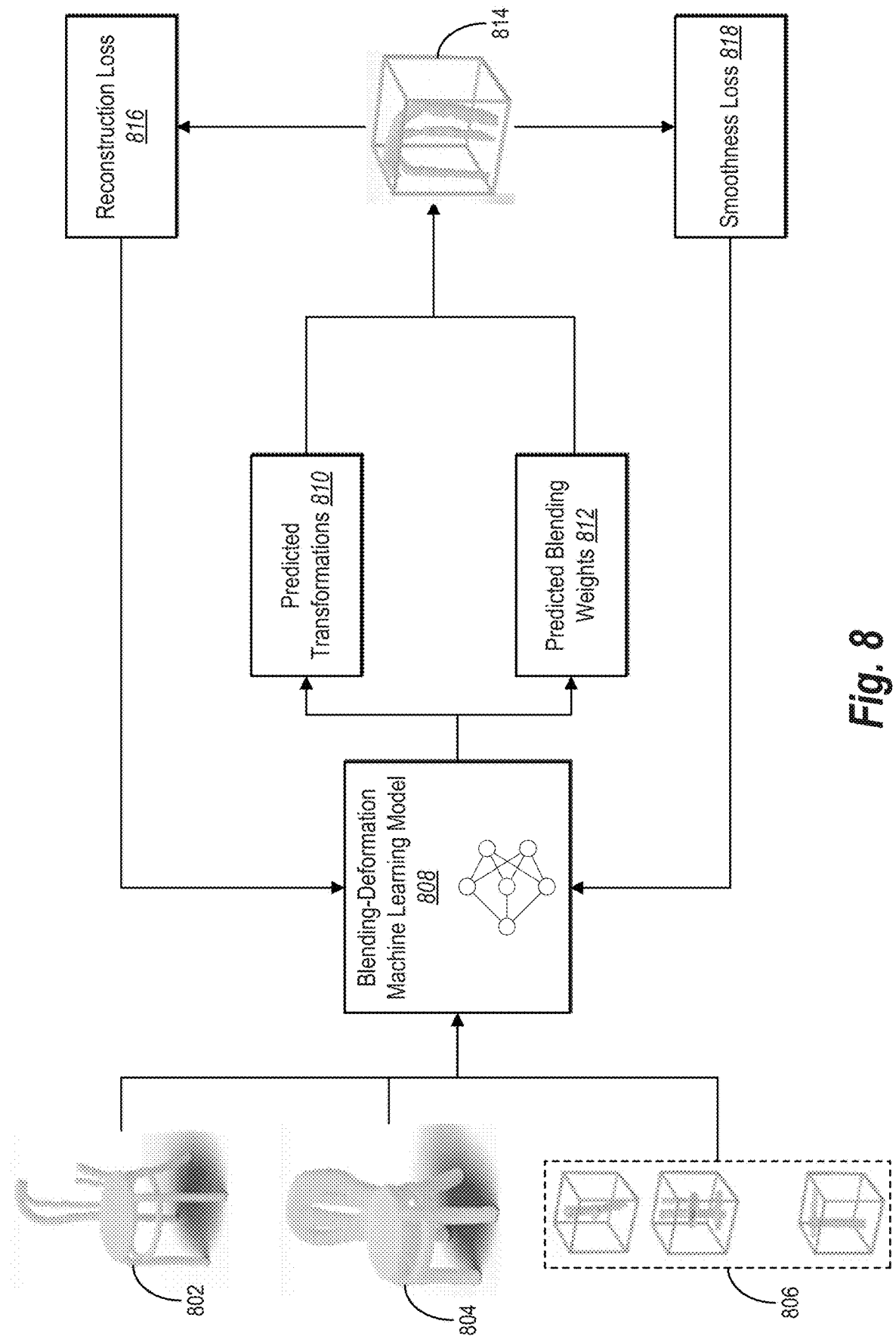
FIG. 8 illustrates a diagram of the shape completion system learning parameters of blending-deformation machine learning model in accordance with one or more implementations.

In particular, FIG. 8 illustrates the shape completion system 102 analyzing an incomplete 3D digital shape 802, a coarse 3D digital shape 804, and a plurality of candidate 3D patches 806. As illustrated, the shape completion system 102 utilizes the blending-deformation machine learning model 808 to analyze the incomplete 3D digital shape 802 (or a portion thereof, such as a sub-volume), a coarse 3D digital shape 804 (or a portion thereof, such as a sub-volume), and the corresponding plurality of candidate 3D patches 806 to generate predicted transformations 810 and predicted blending weights 812. Specifically, the predicted transformations 810 and the predicted blending weights 812 comprise a transformation and blending weight for each candidate 3D patch of the plurality of candidate 3D patches 806.

As shown, the shape completion system 102 also applies the predicted transformations 810 and the predicted blending weights 812 to the plurality of candidate 3D patches 806. In particular, the shape completion system 102 generates a predicted 3D shape 814 (i.e., a complete 3D shape or a sub-volume of a complete 3D shape) based on the predicted transformations 810 and the predicted blending weights 812. The shape completion system 102 then determines one or more measures of loss corresponding to the predicted 3D shape 814.

Indeed, as shown, the shape completion system 102 determines a reconstruction loss 816. The shape completion system 102 determines the reconstruction loss 816 by comparing the predicted 3D shape 814 to a ground truth 3D shape. For instance, the ground truth 3D shape can include a known, complete 3D shape corresponding to the incomplete 3D shape 802. The shape completion system 102 can compare the ground truth 3D shape with the predicted 3D shape 814 and determine a measure of loss utilizing one or more loss functions. The shape completion system 102 can utilize a variety of loss functions, including mean absolute error (L1) loss functions, mean squared error (L2) loss functions, cross entropy loss functions, or Kullback-Leibler loss. The shape completion system 102 then utilize the measure of loss to modify internal weights/parameters of the blending-deformation machine learning model 808 (e.g., utilizing gradient descent and/or backpropagation).

As illustrated in FIG. 8, the shape completion system 102 can also determine a smoothness loss 818. The shape completion system 102 determines the smoothness loss 818 by comparing nearby (e.g., neighboring) regions of the predicted 3D shape 814 and determining a measure of loss based on the comparison. For example, in one or more embodiments, the shape completion system 102 determines transformed candidate 3D shapes (by applying transformations and blending weights) and then compares neighboring transformed candidate 3D shapes (e.g., neighboring pairs) to determine the smoothness loss. In particular, the shape completion system 102 can determine a difference between neighboring pairs and utilize the difference as a measure of loss. The shape completion system 102 can then modify parameters of the blending-deformation machine learning model 808 based on the smoothness loss.

Indeed, directly optimizing deformation and blending parameters is prone to being stuck in local optimum. Accordingly, in one or more implementations, the shape completion system 102 develops a neural network to predict deformations and blending weights and train it with reconstruction and smoothness losses. In particular, the shape completion system 102 trains a neural network g to predict deformation and blending weights. In some implementations, the network consists of three convolutional encoders, one for each voxel grid: the coarse shape (with a binary mask for the cropped sub-volume V), the partial input, and the tensor of retrieved patches (M channels at resolution of V). The shape completion system 102 uses fully-connected layers to mix the output of convolutional encoders into a bottleneck, which is than decoded into deformation T and blending ω parameters.

The reconstruction loss, $L_{rec}$, aims to recover the target shape $\hat{S}^{gt}$:

$$L_{rec}=\|V^{gt}-V\|_2$$

where $V^{gt} \subset \hat{S}^{gt}$ and $V \subset \hat{S}$ are corresponding true and predicted sub-volumes (the shape completion system 102 samples V randomly for training).

The blending smoothness loss $L_{sm}$ regularize patch pairs. Specifically, if two patches have large blending weights for a voxel, then their transformations are forced to be compatible on that voxel:

$$L_{sm} = \sum_{x \in V} \sum_{m,n} \|\omega_m|x| \cdot T_m(r_m)|x| - T_n(r_n)|x|\|$$

where x iterates over the volume and m, n over all retrieved patches. Note that in one or more implementations, $r_m$ and $r_n$ are only defined on a small region based on where the patch is placed, so this sum matters in regions where transformed patches $T_m(r_m)$ and $T_n(r_n)$ map to nearby points x accordingly.

The final loss term is:

$$L=L_{rec}+\alpha L_{sm}$$

Figure 9:
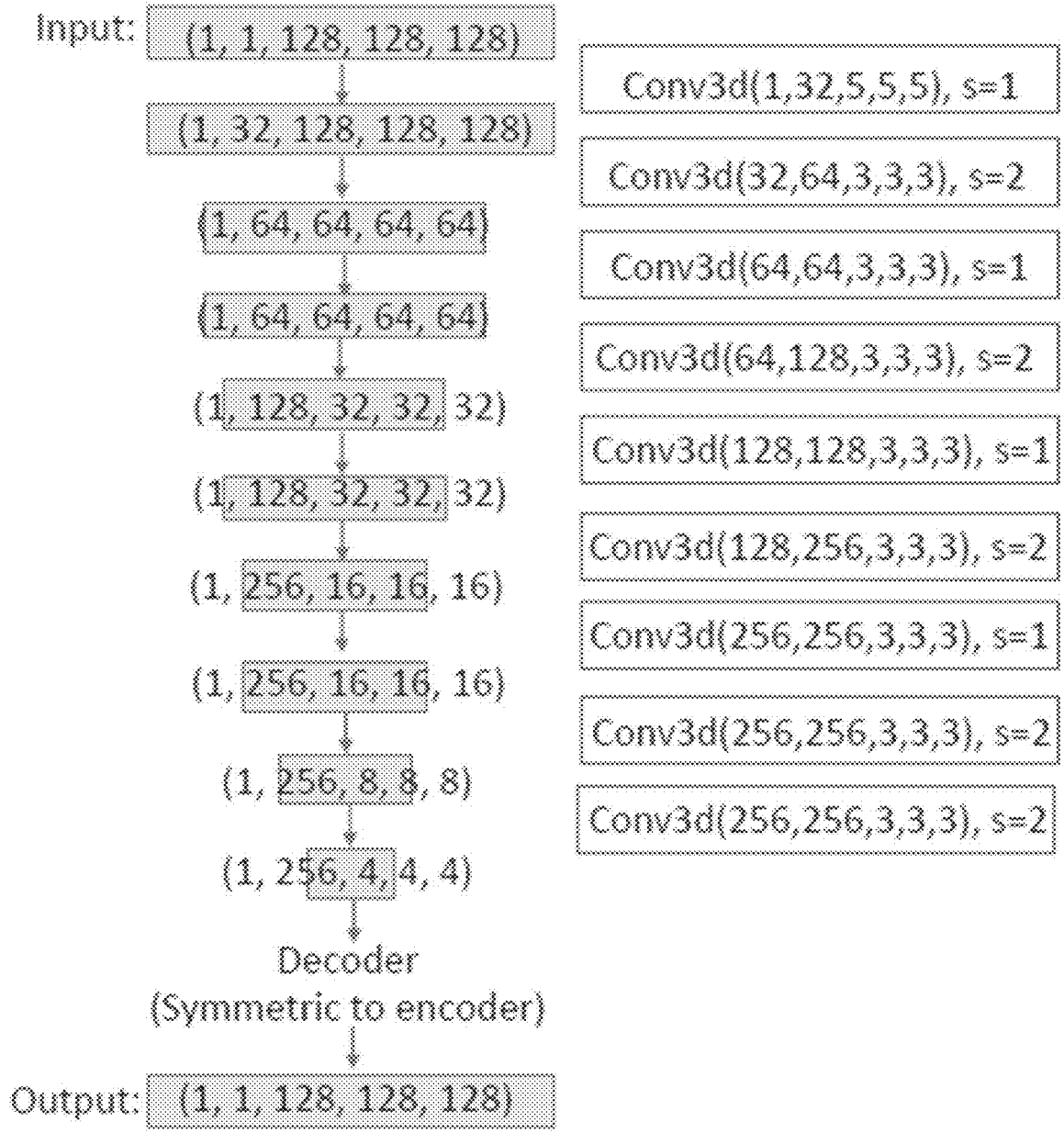
FIG. 9 illustrates a diagram of an example architecture of a coarse 3D digital shape completion neural network in accordance with one or more implementations.
Figure 10:
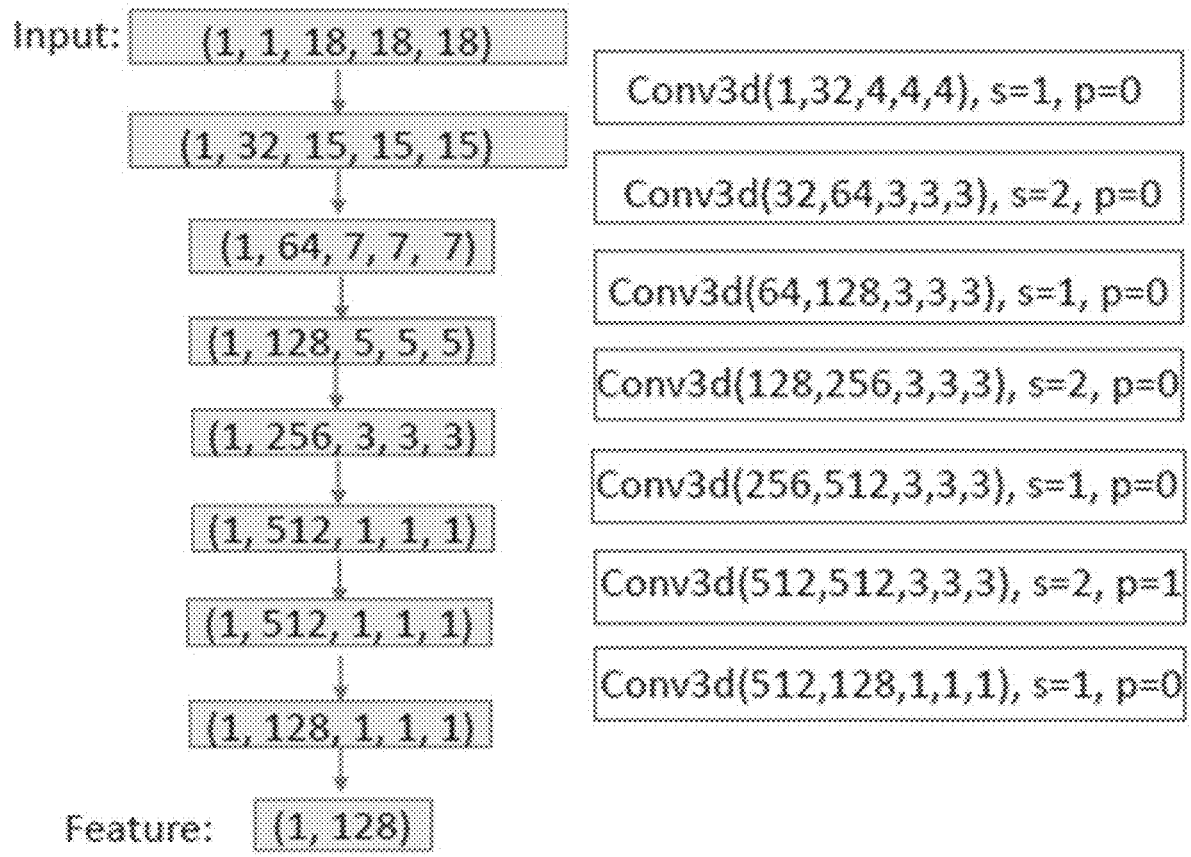
FIG. 10 illustrates a diagram of an example architecture of an encoder neural network in accordance with one or more implementations.
Figure 11:
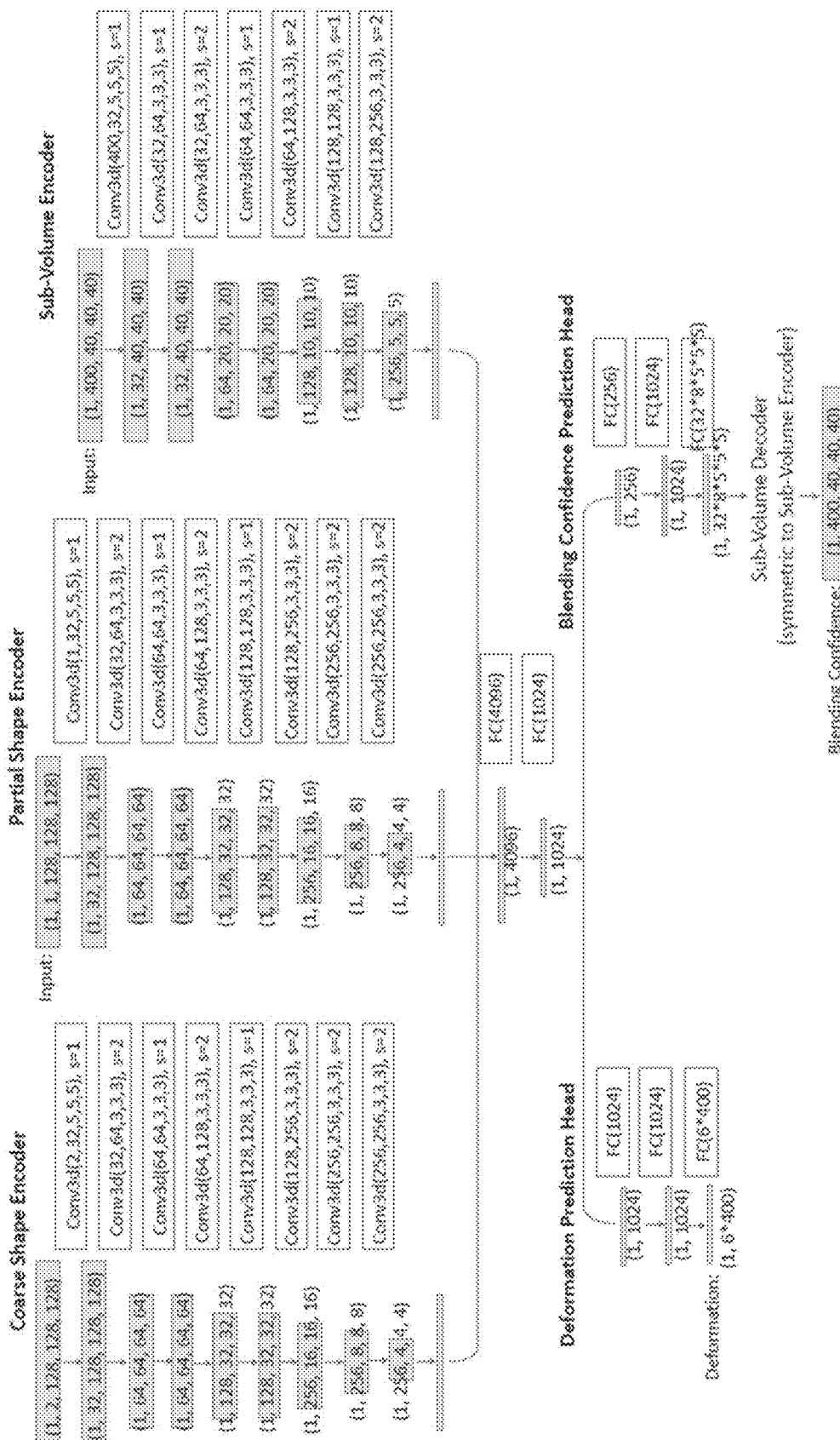
FIG. 11 illustrates a diagram of an example architecture of a blending-deformation neural network in accordance with one or more implementations.

As discussed above, the shape completion system 102 can utilize a variety of architectures to implement the various machine learning models discussed herein. FIGS. 9-11 illustrate exemplary architectures in accordance with one or more embodiments. For example, FIG. 9 illustrates an example embodiment of a coarse completion neural network utilized to generate a coarse 3D digital shape from an incomplete 3D shape in accordance with one or more embodiments. With regard to FIG. 9, the input is a partial shape with size (128; 128; 128) and the output is a coarse shape with the same size. FIG. 9 only illustrates the encoder in detail here, however, the shape completion system 102 can utilize a decoder symmetric to the illustrated architecture of the encoder. In FIG. 9, highlighted boxes are tensors and white boxes are layers between two tensors. The array after Conv3d means (input channel, output channel, kernel size, kernel size, kernel size). The illustrated "s" in FIG. 9 means stride.

FIG. 10 illustrates an architecture of a feature encoder (e.g., the encoder(s) 510) in accordance with one or more embodiments. With regard to FIG. 10, the input is a patch with size (18; 18; 18). The output is a feature vector with size 128. In the figure, highlighted boxes are tensors and white boxes are layers between two tensors. The array after Conv3d means (input channel, output channel, kernel size, kernel size, kernel size). Similar to FIG. 9, the illustrated "s" means stride, while "p" means padding.

FIG. 11 illustrates an example architecture of a blending-deformation neural network in accordance with one or more embodiments. In relation to FIG. 11, there are 3 branches to encode the coarse shape, partial shape, and the sub-volume to one-dimensional feature vectors. Then two heads decode the concatenated feature vectors to deformation and blending weights. In the figure, highlighted boxes are tensors and white boxes are layers between two tensors. The array after Conv3d means (input channel, output channel, kernel size, kernel size, kernel size), while "s" means stride.

As mentioned above, researchers have conducted a variety of experiments regarding the effectiveness of experimental implementations of the shape completion system 102. The following figures describe results from these experiments. In particular, researchers evaluated one or more experimental embodiments on the detail preserving shape completion benchmark, and the results demonstrate the experimental embodiments outperform conventional baselines. Researchers further demonstrate that the shape completion system 102 can generalize beyond the benchmark setup, handling real scans, data with large missing areas, and novel categories of shapes.

Researchers used the following parameters for experiments described below. The sizes of various voxel grids are: $s_{shape}=128$; $s_{patch}=18$; $s_{subv}=40$ with strides $\gamma_{patch}=4$; $\gamma_{subv}=32$. Researchers sampled $|\tau_{rnd}|=800$ and $\tau_{true}=400$ triplets to train patch similarity and the random samples contribute to the loss function with the weight 0.125. Researchers used a blending operator with M=400 best retrieved patches. Researchers set $\alpha=10$. To improve performance researchers also defined blending weights $\omega_m$ at a coarser level than V. In particular, researchers use windows of size $s_{blend}^3=83$ to have constant weight, and compute the blending smoothness term at the boundary of these windows.

Researchers used shapes from ShapeNet, a public large-scale repository of 3D meshes to create the completion benchmark. Researchers picked eight shape categories. For each category, researchers used the same subset of training and testing shapes with 80%/20% split. For voxel-based methods, researchers converted each mesh to a $128^3$ voxel grid, and for point-based baselines, researchers used the existing point clouds with 16384 points per mesh. Researchers created synthetic incomplete shapes by cropping a random cuboid with 10%-30% volume with respect to the full shape.

To evaluate the quality of the completion researchers used the L2 Chamfer Distance (CD) with respect to the ground truth detailed shape. Since CD does not really evaluate the quality of finer details, researchers also used Frechet Inception Distance (FID), to evaluate plausibility. FID metric computes the distance of the activation of layers from a pretrained shape classifier trained on ShapeNet and activations of the first fully connected layer.

Researchers considered baselines that span different shape representations, including
- "PCN" as described by Wentao Yuan, Tejas Khot, David Held, Christoph Mertz, and Martial Hebert. Pcn: Point completion network. In 3D Vision (3DV), 2018 International Conference on 3D Vision, 2018;
- "TopNet" as described by Lyne P Tchapmi, Vineet Kosaraju, S. Hamid Rezatofighi, Ian Reid, and Silvio Savarese. Topnet: Structural point cloud decoder. In The IEEE Conference on Computer Vision and Pattern Recognition (CVPR), 2019;
- "GRNet" as described by Haozhe Xie, Hongxun Yao, Shangchen Zhou, Jiageng Mao, Shengping Zhang, and Wenxiu Sun. Grnet: Gridding residual network for dense point cloud completion. In ECCV, 2020;
- "VRCNet" as described by Liang Pan, Xinyi Chen, Zhongang Cai, Junzhe Zhang, Haiyu Zhao, Shuai Yi, and Ziwei Liu. Variational relational point completion network. arXiv preprint arXiv:2104.10154, 2021; and
- SnowFlakeNet" as described by Peng Xiang, Xin Wen, Yu-Shen Liu, Yan-Pei Cao, Pengfei Wan, Wen Zheng, and Zhizhong Han. Snowflakenet: Point cloud completion by snowflake point deconvolution with skip-transformer. In ICCV, 2021;
- "3D-GAN" as described by Jiajun Wu, Chengkai Zhang, Tianfan Xue, William T Freeman, and Joshua B Tenenbaum. Learning a probabilistic latent space of object shapes via 3d generative-adversarial modeling. In Advances in Neural Information Processing Systems, pages 82-90, 2016; an implicit surfaces-based shape reconstruction methods;
- "Conv-ONet" as described by Songyou Peng, Michael Niemeyer, Lars Mescheder, Marc Pollefeys, and Andreas Geiger. Convolutional occupancy networks. In European Conference on Computer Vision (ECCV), 2020; and
- "AtlasNet" as described by Thibault Groueix, Matthew Fisher, Vladimir G. Kim, Bryan Russell, and Mathieu Aubry. AtlasNet: A Papier-Mâch e Approach to Learning 3D Surface Generation. In Proceedings IEEE Conf. on Computer Vision and Pattern Recognition (CVPR), 2018.

Figure 12:
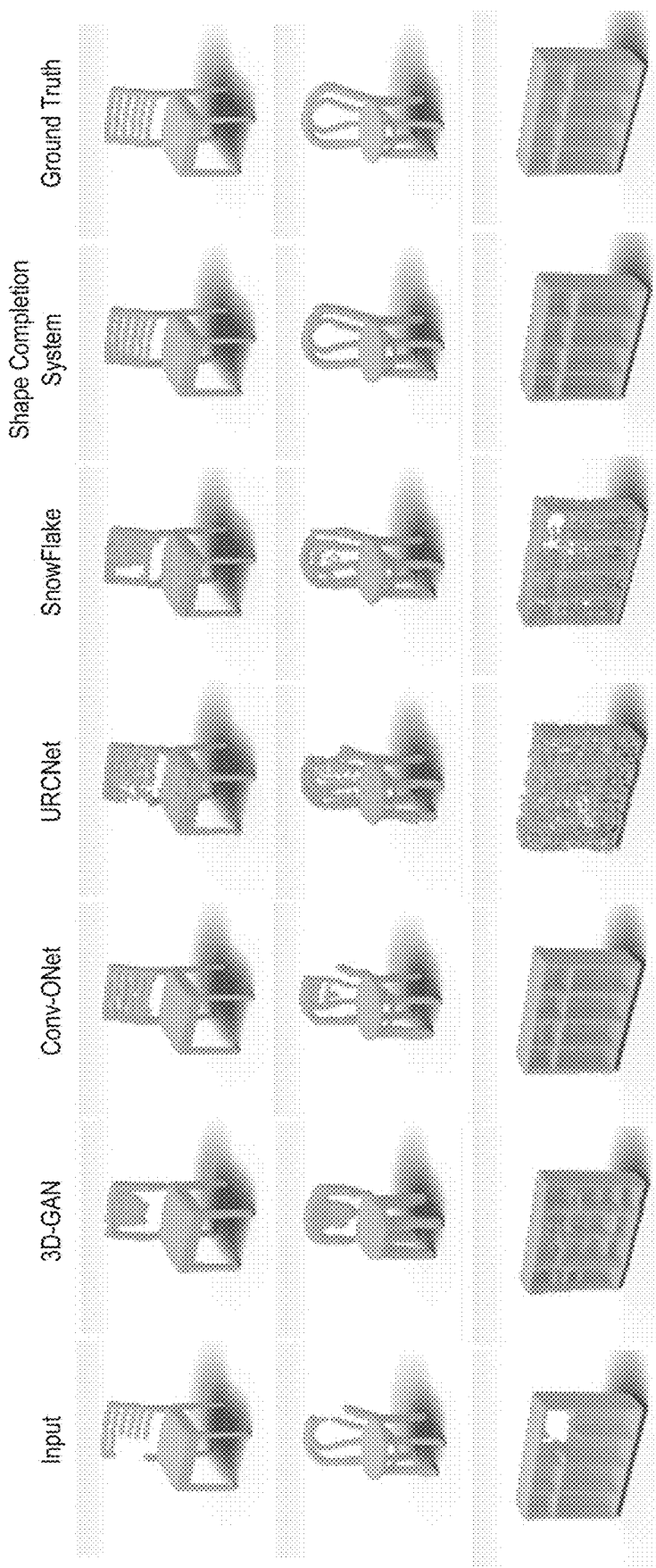
FIG. 12 illustrates experimental results from implementing the shape completion system in accordance with one or more implementations.

Researchers demonstrated that experimental implementations of the shape completion system 102 outperforms these baselines both quantitatively and qualitatively. For example, FIG. 12 illustrates qualitative shape completion results. As shown, the experimental embodiment of the shape completion system 102 recovers more geometric details and keep the shape smooth while other baselines often produce coarse, noisy, or discontinuous results.

Indeed, results for the shape completion system 102 show better shape quality by recovering the local details as well as preserving the global shape smoothness. Specifically, the voxel-based baseline (3D-GAN) produces coarse shapes where fine details are missing. Point-based baselines (VRCNet and SnowFlake) often have noisy patterns around on fine structures while the shape completion system 102 has clean geometry details. The implicit surface based method (Con-ONet) could capture the details but the geometry is not smooth and the topology is not preserved. The illustrated embodiment of shape completion system 102 keeps the smooth connection between geometry patches.

FIGS. 13A-13B show a quantitative comparison between the experimental embodiment of the shape completion system 102 and baselines, which shows the shape completion system 102 significantly outperforms all baselines. The shape completion system 102 achieved superior performance on all categories except airplanes, which shows that it generalizes well across different classes of shapes.

Figure 14:
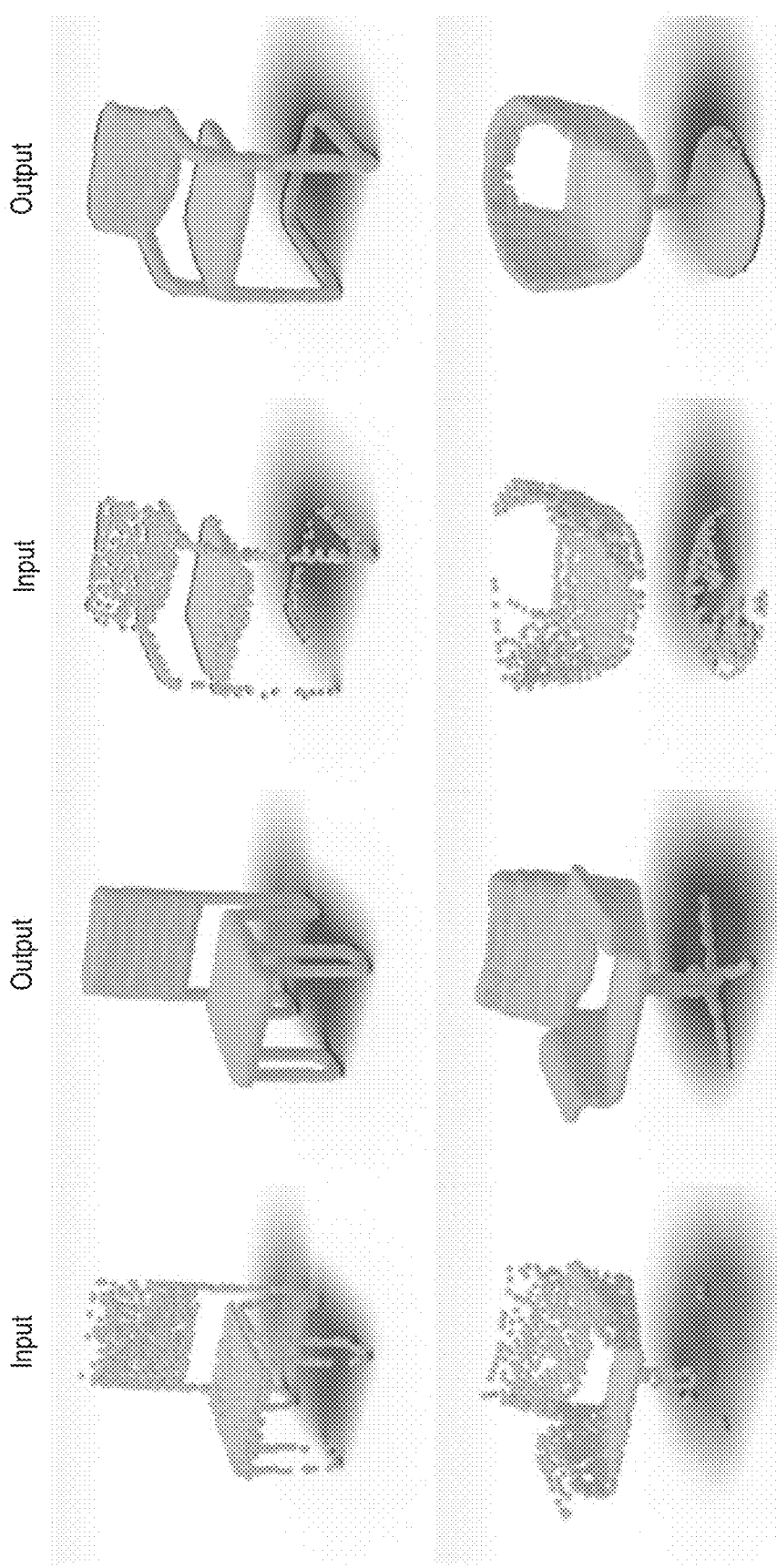
FIG. 14 illustrates additional experimental results from implementing the shape completion system in accordance with one or more implementations.

Researchers also tested the proposed approach on real-world shape completion from scans. Researchers use shapes from ScanNet, 3D indoor scene dataset as input. Objects in ScanNet often have some missing parts, especially thin structures, due to the occlusion and incompleteness of scan viewpoints. Researchers converted these point clouds to voxel grids and applied an experimental embodiment of the shape completion system 102 trained on ShapeNet. The results are illustrated in FIG. 14. Notably, the shape completion system 102 completes the undersampled areas, while preserving the details of the input and smoothly blending new details to the existing content.

Figure 15:
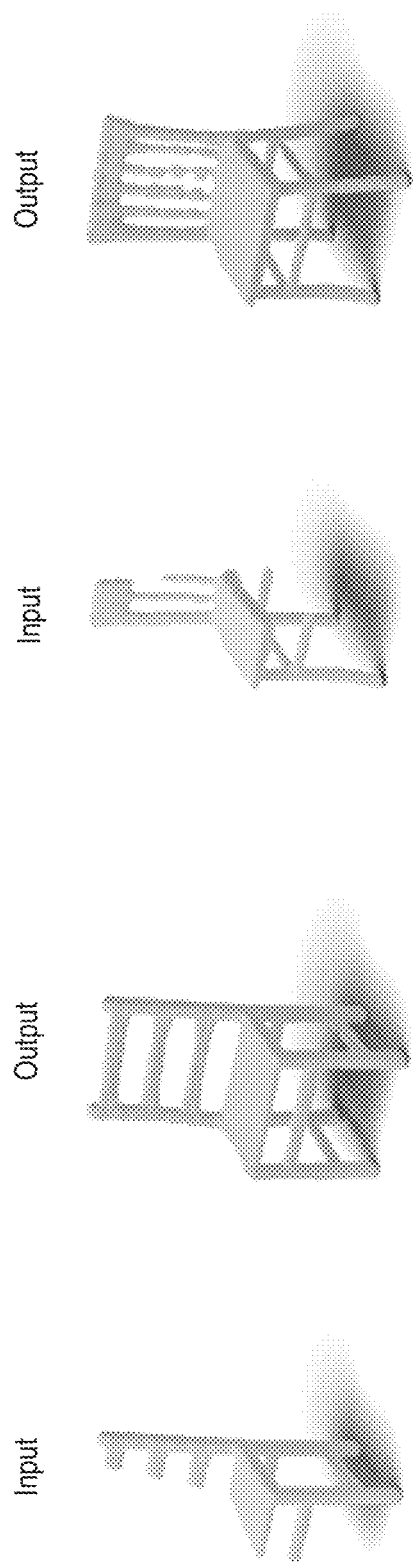
FIG. 15 illustrates additional experimental results from implementing the shape completion system in accordance with one or more implementations.
Figure 16:
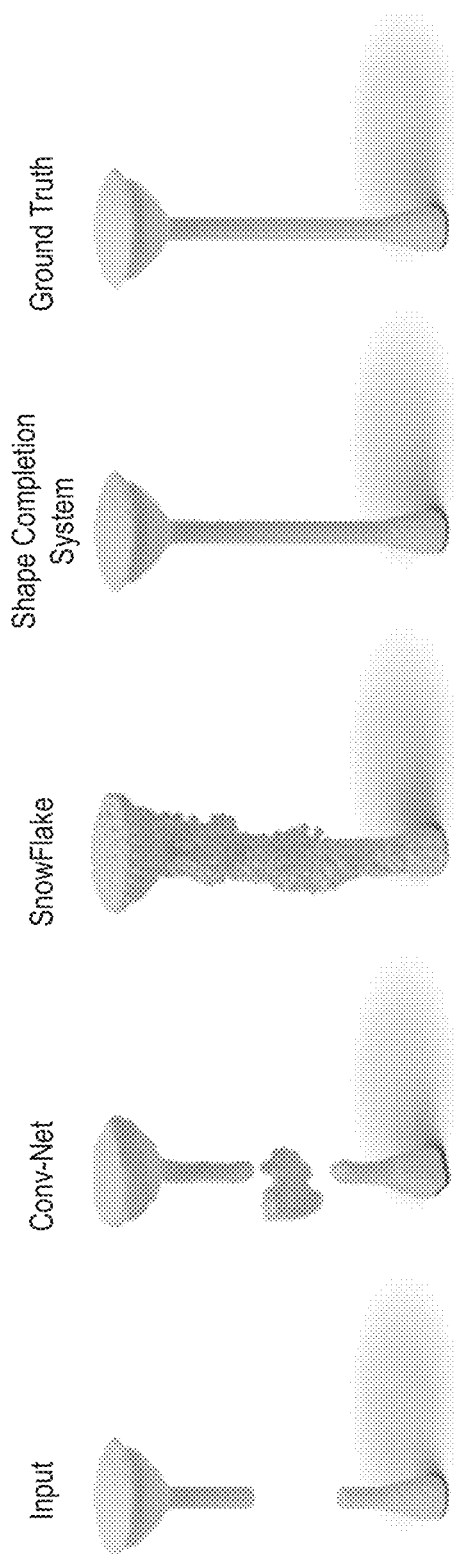
FIG. 16 illustrates additional experimental results from implementing the shape completion system in accordance with one or more implementations.

Researchers also demonstrated that the disclosed approach can handle large missing areas. Indeed, in an additional experiment, researchers cut a shape with a random plane, where in some cases more than half of the shape was missing. As illustrated in FIG. 15, the experimental embodiment of the shape completion system 102 recovered the shape structure and extended the local shape details to the whole shape when only given a small region of reference details.

Researchers also evaluated the ability of the shape completion system 102 to generalize to novel categories. Note that only the complete coarse shape prediction step relies on any global categorical priors. Unlike other generative techniques that decode the entire shape, the shape completion system 102 need not learn how to synthesize category-specific details and thus succeeds in detail-preservation as long as coarse shape is somewhat reasonable. FIG.

16 illustrates the output of different methods when tested on a novel category. Note how the experimental embodiment of the shape completion system 102 is most successful in conveying overall shape as well as matching the details of the input.

Figures 17A, 17B:
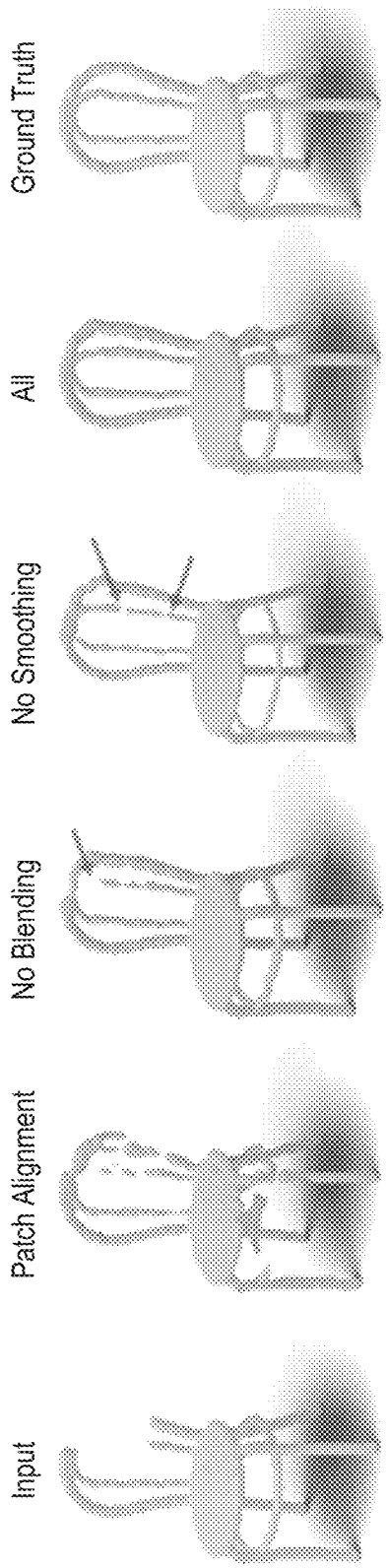
FIGS. 17A-17B illustrate additional experimental results from implementing the shape completion system in accordance with one or more implementations.

Researchers also evaluated the significance of deformation learning patch blending, and blending smoothness term via an ablation study. To analyze the possibility of no deformation learning, researchers used ICP to align retrieved patches to the query. FIG. 17A illustrates that this leads to zigzagging artifacts due to patch misalignments.

To test no patch blending, instead of blending several retrieved patches, researchers placed the best retrieved patch at the query location. FIG. 17A illustrates the best patch might not be sufficient, leading to missing regions in the output.

To test no blending smoothness, researchers set the blending smoothness to $L_{sm}=0$ to remove a penalty for misalignments at patch boundaries. As shown in FIG. 17A, doing so leads to artifacts and discontinuities at patch boundaries.

Moreover, the quantitative results in FIG. 17B show that the shape completion system 102 with all components performs the best with respect to reconstruction and plausibility metrics.

Figure 18:
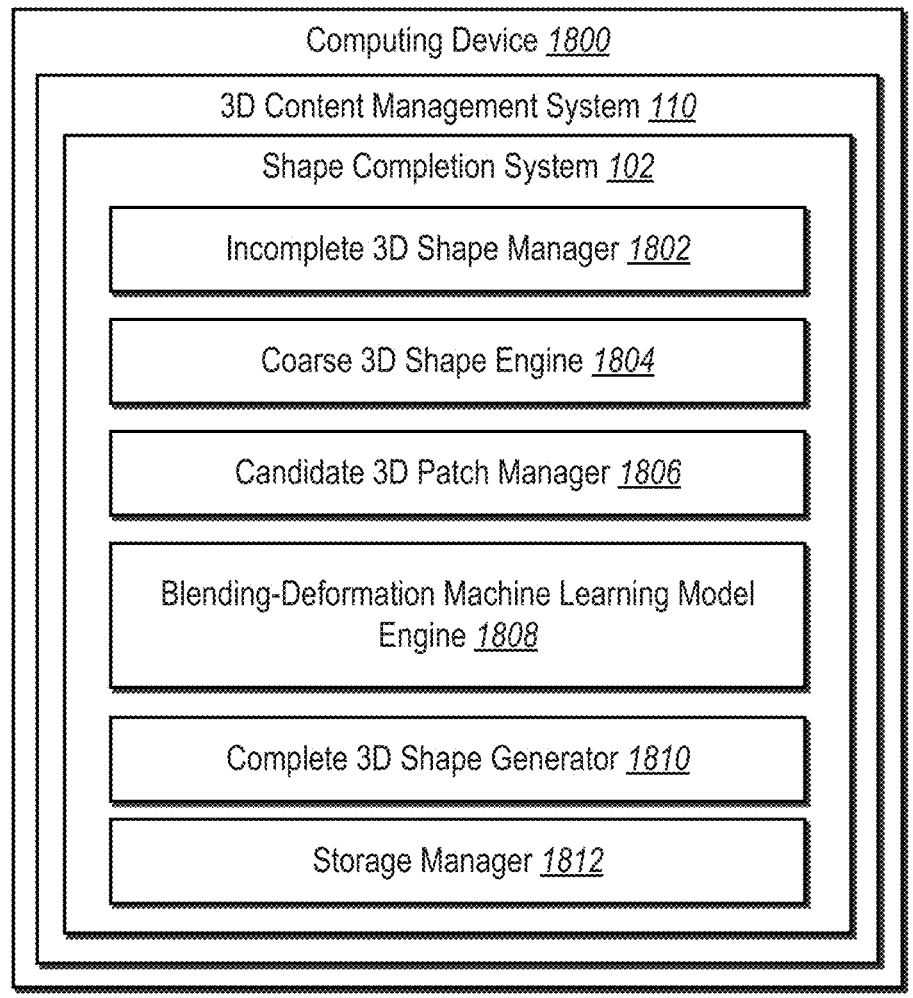
FIG. 18 illustrates a diagram of the shape completion system of FIG. 1 in accordance with one or more implementations.

FIG. 18 illustrates a detailed schematic diagram of an embodiment of the shape completion system 102 described above. As shown, the shape completion system 102 is implemented in a 3D content management system 110 on computing device(s) 1800 (e.g., a client device and/or server device as described in FIG. 1, and as further described below in relation to FIG. 20). Additionally, the shape completion system 102 includes, but is not limited to, an incomplete 3D shape manager 1802, a coarse 3D shape engine 1804, a candidate 3D patch manager 1806, a blending-deformation machine learning model engine 1808, a complete 3D shape generator 1810, and a storage manager 1812. The shape completion system 102 can be implemented on any number of computing devices. For example, the shape completion system 102 can be implemented in a distributed system of server devices for generating mappings of three-dimensional meshes. The shape completion system 102 can also be implemented within one or more additional systems. Alternatively, the shape completion system 102 can be implemented on a single computing device such as a single client device.

In one or more embodiments, each of the components of the shape completion system 102 is in communication with other components using any suitable communication technologies. Additionally, the components of the shape completion system 102 are capable of being in communication with one or more other devices including other computing devices of a user, server devices (e.g., cloud storage devices), licensing servers, or other devices/systems. It will be recognized that although the components of the shape completion system 102 are shown to be separate in FIG. 18, any of the subcomponents may be combined into fewer components, such as into a single component, or divided into more components as may serve a particular implementation. Furthermore, although the components of FIG. 18 are described in connection with the shape completion system 102, at least some of the components for performing operations in conjunction with the shape completion system 102 described herein may be implemented on other devices within the environment.

In some embodiments, the components of the shape completion system 102 include software, hardware, or both. For example, the components of the shape completion system 102 include one or more instructions stored on a computer-readable storage medium and executable by processors of one or more computing devices (e.g., the computing device(s) 1800). When executed by the one or more processors, the computer-executable instructions of the shape completion system 102 cause the computing device(s) 1800 to perform the operations described herein. Alternatively, the components of the shape completion system 102 can include hardware, such as a special purpose processing device to perform a certain function or group of functions. Additionally, or alternatively, the components of the shape completion system 102 can include a combination of computer-executable instructions and hardware.

Furthermore, the components of the shape completion system 102 performing the functions described herein with respect to the shape completion system 102 may, for example, be implemented as part of a stand-alone application, as a module of an application, as a plug-in for applications, as a library function or functions that may be called by other applications, and/or as a cloud-computing model. Thus, the components of the shape completion system 102 may be implemented as part of a stand-alone application on a personal computing device or a mobile device. Alternatively, or additionally, the components of the shape completion system 102 may be implemented in any application that provides digital image modification, including, but not limited to ADOBE® AFTER EFFECTS®, ADOBE® ILLUSTRATOR®, and ADOBE® CREATIVE CLOUD®.

As shown in FIG. 18, the shape completion system 102 includes the incomplete 3D shape manager 1802. The incomplete 3D shape manager identifies, retrieves, receives, and/or generates incomplete 3D digital shapes. For example, the incomplete 3D shape manager 1802 generates a 3D shape utilizing a three-dimensional shape editing application and/or a scanning resource/tool.

As illustrated in FIG. 18, the shape completion system 102 also includes a coarse 3D shape engine 1804. The coarse 3D shape engine 1804 generates, creates, and/or produces a coarse 3D shape from an incomplete 3D shape. As discussed above, the coarse 3D shape engine 1804 utilizes a coarse completion machine learning model to generate a coarse 3D shape that includes completed regions at a lower resolution relative to the incomplete 3D shape.

Moreover, as shown in FIG. 18, the shape completion system 102 includes a candidate 3D patch manager 1806. The candidate 3D patch manager 1806 can identify, retrieve, extract, determine, and/or select candidate 3D patches. For example, the candidate 3D patch manager 1806 can include an encoder neural network that analyzes candidate 3D patches and selects a set of candidate 3D patches that best match a coarse 3D patch from the coarse 3D shape. As discussed above, the candidate 3D patch manager can identify a set of candidate 3D patches corresponding to each coarse 3D patch sampled from the coarse 3D shape.

In addition, as shown in FIG. 18, the shape completion system 102 also includes the blending-deformation machine learning model engine 1808. In particular, the blending-deformation machine learning model engine 1808 can train and/or utilize a blending-deformation machine learning model. As discussed above, the blending-deformation machine learning model engine 1808 can generate transformations and/or training weights for candidate 3D patches.

As illustrated in FIG. 18, the shape completion system 102 also includes a complete 3D shape generator 1810. For example, the complete 3D shape generator 1810 can generate, create, our determine a complete 3D shape. As discussed above, the complete 3D shape generator 1810 can apply transformations and blending weights to candidate 3D shapes to generate a complete 3D shape from an incomplete 3D shape.

As shown, the shape completion system 102 also includes a storage manager 1812 (that comprises a non-transitory computer memory/one or more memory devices) that stores and maintains data associated with generating mappings of three-dimensional meshes. For example, the storage manager 1812 stores data, such as, incomplete 3D digital shapes, machine learning parameters (e.g., a coarse completion neural network, an encoder neural network, and/or a blending-deformation neural network), coarse 3D digital shapes, encodings, and/or complete 3D shapes.

Turning now to FIG. 19, this figure shows a flowchart of a series of acts 1900 of generating a complete 3D digital shape from an incomplete digital 3D digital shape based on retrieving and combining candidate 3D patches in accordance with one or more implementations. While FIG. 19 illustrates acts according to one embodiment, alternative embodiments may omit, add to, reorder, and/or modify any of the acts shown in FIG. 19. The acts of FIG. 19 can be performed as part of a method. Alternatively, a non-transitory computer readable medium can comprise instructions, that when executed by one or more processors, cause a computing device to perform the acts of FIG. 19. In still further embodiments, a system can perform the acts of FIG. 19.

As shown, the series of acts 1900 includes acts 1902-1908 of generating a coarse 3D digital shape from an incomplete 3D digital shape; sampling coarse 3D patches from the coarse 3D digital shape; retrieving a plurality of candidate 3D patches from the incomplete 3D digital shape based on the coarse 3D patches; and generating a complete 3D shape by combining the plurality of candidate 3D patches.

For example, in one or more implementations the acts 1902-1908 include generating, utilizing a machine learning model, a coarse 3D digital shape from an incomplete 3D digital shape; sampling coarse 3D patches from the coarse 3D digital shape within a plurality of patch regions; retrieving, for the plurality of patch regions, a plurality of candidate 3D patches from the incomplete 3D digital shape based on the coarse 3D patches; and generating a complete 3D shape by combining the plurality of candidate 3D patches for the plurality of patch regions.

In one or more implementations the series of acts 1900 includes, for a patch region of the plurality of patch regions: determining a set of candidate 3D patches for a sub-volume from the plurality of candidate 3D patches for the plurality of patch regions; generating a transformed 3D sub-volume by blending the set of candidate 3D patches for the sub-volume; and generating the complete 3D shape utilizing the transformed 3D sub-volume.

Moreover, in one or more embodiments, generating the transformed 3D sub-volume comprises: generating, utilizing a blending-deformation machine learning model, blending weights and transformations corresponding to the set of candidate 3D patches; and blending the plurality of candidate 3D patches utilizing the blending weights and the transformations.

Furthermore, in one or more implementations, blending the plurality of candidate 3D patches further comprises: applying the transformations to the plurality of candidate 3D patches to generate transformed candidate 3D patches; and combining the transformed candidate 3D patches utilizing the blending weights.

In one or more embodiments, generating the coarse 3D digital shape comprises utilizing a convolutional neural network to generate the coarse 3D digital shape, and wherein the coarse 3D digital shape has a lower resolution than the incomplete 3D digital shape.

In addition, in one or more embodiments, retrieving the plurality of candidate 3D patches comprises, for a candidate 3D patch of a patch region: generating, utilizing a first encoder, a coarse 3D patch encoding from a coarse 3D patch corresponding to the patch region; generating, utilizing a second encoder, a candidate 3D patch encoding from the candidate 3D patch; and comparing the coarse 3D patch encoding to the candidate 3D patch encoding. Indeed, in one or more embodiments, comparing the coarse 3D patch encoding to the candidate 3D patch encoding comprises determining a distance between the coarse 3D patch encoding and the candidate 3D patch encoding within a feature space.

The series of acts 1900 can also include training the first encoder and the second encoder utilizing a first 3D sample and a second 3D sample by: determining a geometric distance agnostic to transformations by analyzing distance metrics across combinations of transformations of the first 3D sample and the second 3D sample; and modifying parameters of the first encoder and the second encoder by comparing an embedding distance between the first 3D sample and the second 3D sample in a feature space to the geometric distance.

In one or more embodiments, the series of acts 1900 also includes for a patch region: generating, utilizing a blending-deformation neural network, blending weights corresponding to a set of candidate 3D patches for the patch region; generating, utilizing the blending-deformation neural network, transformations corresponding to the set of candidate 3D patches for the patch region; and blending the plurality of candidate 3D patches for the patch region utilizing the blending weights and the transformations.

The series of acts 1900 can also include training the blending-deformation neural network utilizing a reconstruction loss and a smoothness loss.

In one or more embodiments, the incomplete 3D digital shape has a first resolution and the series of acts 1900 further includes generating the coarse 3D digital shape utilizing the machine learning model by utilizing a convolutional neural network to generate a 3D shape having a second resolution lower than the first resolution.

In one or more implementations, the series of acts 1900 includes retrieving the plurality of candidate 3D patches by: generating, utilizing one or more encoders, a coarse 3D patch encoding in a feature space from a coarse 3D patch of the coarse 3D patches; and generating, utilizing the one or more encoders, a plurality of candidate 3D patch encodings in the feature space from the plurality of candidate 3D patches. Indeed, the series of acts 1900 can include retrieving the plurality of candidate 3D patches based on distances between the coarse 3D patch encoding and the plurality of candidate 3D patch encodings within the feature space.

In one or more implementations the acts 1902-1908 can include generating, utilizing a convolutional neural network, a coarse 3D digital shape from an incomplete 3D digital shape; extracting a plurality of candidate 3D patches corresponding to a coarse 3D patch sampled from the coarse 3D digital shape by: generating, utilizing an encoder, candidate 3D patch encodings from the plurality of candidate 3D patches and a candidate coarse 3D patch encoding from the coarse 3D patch; and comparing distances between the candidate 3D patch encodings and the candidate coarse 3D patch encodings; and generating a complete 3D shape by determining transformations and blending weights for the plurality of candidate 3D patches.

For example, in some implementations generating the complete 3D shape comprises applying the transformations to the plurality of candidate 3D patches to generate transformed candidate 3D patches. In addition, in some embodiments, generating the complete 3D shape comprises blending the transformed candidate 3D patches utilizing the blending weights.

Moreover, in one or more embodiments, the series of acts 1900 includes determining an additional coarse 3D patch from the coarse 3D digital shape; retrieving an additional plurality of candidate 3D patches based on the additional coarse 3D patch; and generating the complete 3D shape utilizing the plurality of candidate 3D patches and the additional plurality of candidate 3D patches.

Furthermore, in one or more implementations, the series of acts 1900 includes generating a first 3D sub-volume by blending the plurality of candidate 3D patches utilizing a first set of transformations and a first set of blending weights; and generating a second 3D sub-volume by blending the additional plurality of candidate 3D patches utilizing a second set of transformations and a second set of blending weights. Moreover, the series of acts 1900 can also include generating the complete 3D shape comprises combining the first 3D sub-volume and the second 3D sub-volume Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 20:
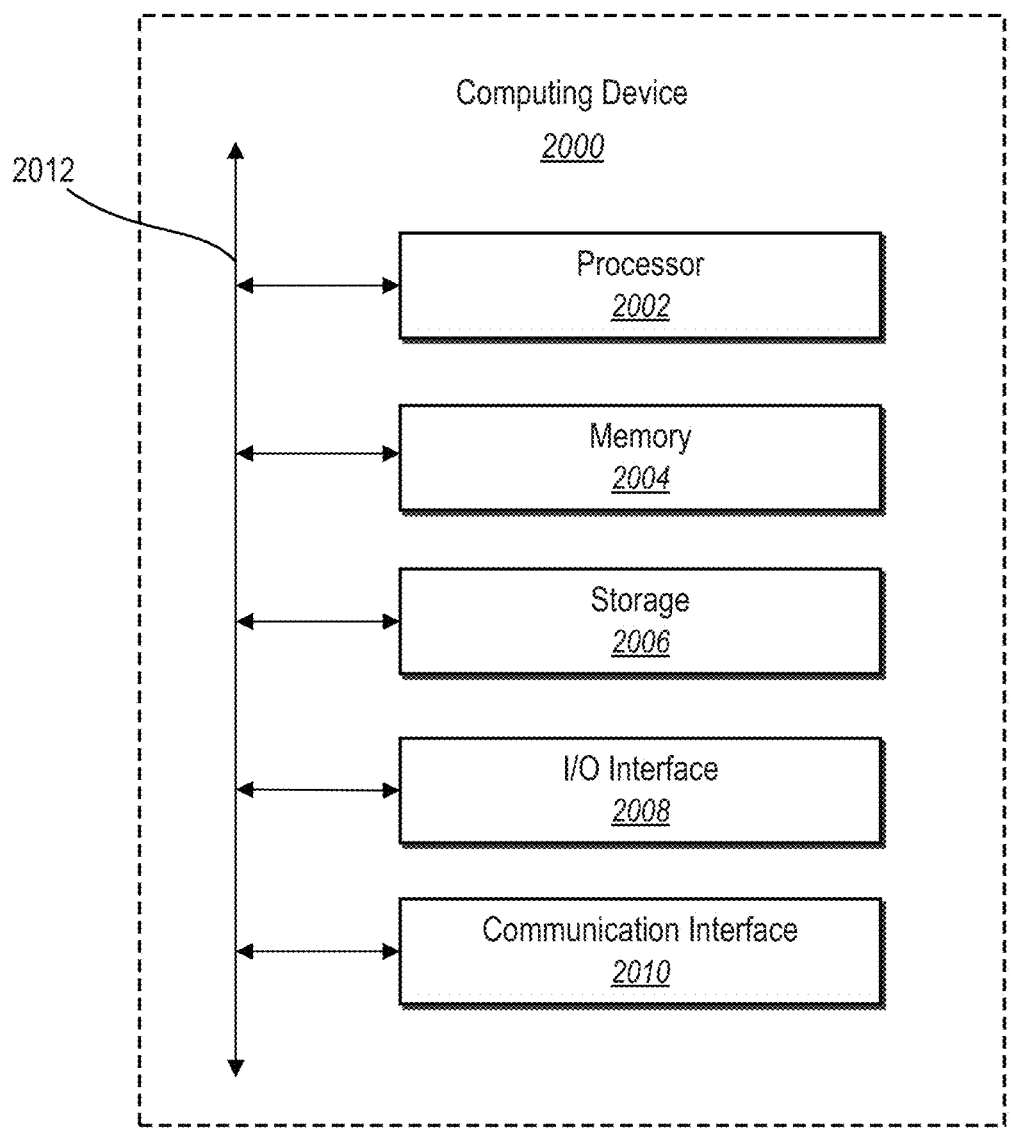
FIG. 20 illustrates a block diagram of an exemplary computing device in accordance with one or more embodiments.

FIG. 20 illustrates a block diagram of exemplary computing device 2000 that may be configured to perform one or more of the processes described above. One will appreciate that one or more computing devices such as the computing device 2000 may implement the system(s) of FIG. 1. As shown by FIG. 20, the computing device 2000 can comprise a processor 2002, a memory 2004, a storage device 2006, an I/O interface 2008, and a communication interface 2010, which may be communicatively coupled by way of a communication infrastructure 2012. In certain embodiments, the computing device 2000 can include fewer or more components than those shown in FIG. 20. Components of the computing device 2000 shown in FIG. 20 will now be described in additional detail.

In one or more embodiments, the processor 2002 includes hardware for executing instructions, such as those making up a computer program. As an example, and not by way of limitation, to execute instructions for dynamically modifying workflows, the processor 2002 may retrieve (or fetch) the instructions from an internal register, an internal cache, the memory 2004, or the storage device 2006 and decode and execute them. The memory 2004 may be a volatile or non-volatile memory used for storing data, metadata, and programs for execution by the processor(s). The storage device 2006 includes storage, such as a hard disk, flash disk drive, or other digital storage device, for storing data or instructions for performing the methods described herein.

The I/O interface 2008 allows a user to provide input to, receive output from, and otherwise transfer data to and receive data from computing device 2000. The I/O interface 2008 may include a mouse, a keypad or a keyboard, a touch screen, a camera, an optical scanner, network interface, modem, other known I/O devices or a combination of such I/O interfaces. The I/O interface 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 2008 is configured to provide graphical data to a display for presentation to a user. The graphical data may be representative of one or more graphical user interfaces and/or any other graphical content as may serve a particular implementation.

The communication interface 2010 can include hardware, software, or both. In any event, the communication interface 2010 can provide one or more interfaces for communication (such as, for example, packet-based communication) between the computing device 2000 and one or more other computing devices or networks. As an example, and not by way of limitation, the communication interface 2010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 2010 may facilitate communications with various types of wired or wireless networks. The communication interface 2010 may also facilitate communications using various communication protocols. The communication infrastructure 2012 may also include hardware, software, or both that couples components of the computing device 2000 to each other. For example, the communication interface 2010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:
1. A computer-implemented method comprising:
generating, utilizing a machine learning model, a coarse 3D digital shape from an incomplete 3D digital shape;
sampling a plurality of coarse 3D patches from the coarse 3D digital shape from within a plurality of patch regions across the coarse 3D digital shape;
retrieving, for the plurality of patch regions, a plurality of candidate 3D patches from the incomplete 3D digital shape based on the plurality of coarse 3D patches by, for a first patch region of the plurality of patch regions:
generating geometric similarity measures between a first coarse 3D patch of the plurality of coarse 3D patches from the coarse 3D digital shape and a plurality of 3D patches from across the incomplete 3D digital shape; and
selecting a candidate 3D patch of the plurality of candidate 3D patches utilizing the geometric similarity measures; and generating a complete 3D shape by combining the plurality of candidate 3D patches for the plurality of patch regions.

2. The computer-implemented method of claim 1, further comprising, for a patch region of the plurality of patch regions:
determining a set of candidate 3D patches for a sub-volume from the plurality of candidate 3D patches for the plurality of patch regions;
generating a transformed 3D sub-volume by blending the set of candidate 3D patches for the sub-volume; and
generating the complete 3D shape utilizing the transformed 3D sub-volume.

3. The computer-implemented method of claim 2, wherein generating the transformed 3D sub-volume comprises:
generating, utilizing a blending-deformation machine learning model, blending weights and transformations corresponding to the set of candidate 3D patches; and
blending the plurality of candidate 3D patches utilizing the blending weights and the transformations.

4. The computer-implemented method of claim 3, wherein blending the plurality of candidate 3D patches further comprises:
applying the transformations to the plurality of candidate 3D patches to generate transformed candidate 3D patches; and
combining the transformed candidate 3D patches utilizing the blending weights.

5. The computer-implemented method of claim 1, wherein generating the coarse 3D digital shape comprises utilizing a convolutional neural network to generate the coarse 3D digital shape, and wherein the coarse 3D digital shape has a lower resolution than the incomplete 3D digital shape.

6. The computer-implemented method of claim 1, wherein generating the geometric similarity measures comprises:
generating, utilizing a first encoder, a coarse 3D patch encoding from the first coarse 3D patch;
generating, utilizing a second encoder, a plurality of 3D patch encodings from the plurality of 3D patches; and
comparing the coarse 3D patch encoding and the plurality of 3D patch encodings to determine the geometric similarity measures.

7. The computer-implemented method of claim 6, wherein comparing the coarse 3D patch encoding and the plurality of 3D patch encodings comprises determining distances between the coarse 3D patch encoding and the plurality of 3D patch encodings within a feature space.

8. The computer-implemented method of claim 6, further comprising training the first encoder and the second encoder utilizing a first 3D sample and a second 3D sample by:
determining a geometric distance agnostic to transformations by analyzing distance metrics across combinations of transformations of the first 3D sample and the second 3D sample; and
modifying parameters of the first encoder and the second encoder by comparing an embedding distance between the first 3D sample and the second 3D sample in a feature space to the geometric distance.

9. A system comprising:
one or more computer memory devices; and
one or more processing devices configured to cause the system to:

generate, utilizing a machine learning model, a coarse 3D digital shape from an incomplete 3D digital shape;
sampling a plurality of coarse 3D patches from the coarse 3D digital shape from within a plurality of patch regions across the coarse 3D digital shape;
retrieving, for the plurality of patch regions, a plurality of candidate 3D patches from the incomplete 3D digital shape based on the plurality of coarse 3D patches by, for a first patch region of the plurality of patch regions:
generating geometric similarity measures between a first coarse 3D patch of the plurality of coarse 3D patches from the coarse 3D digital shape and a plurality of 3D patches from across the incomplete 3D digital shape; and
selecting a candidate 3D patch of the plurality of candidate 3D patches utilizing the geometric similarity measures; and
generate a complete 3D shape by blending the plurality of candidate 3D patches for the plurality of patch regions.

10. The system of claim 9, wherein the one or more processing devices are further configured to, for a patch region:
generate, utilizing a blending-deformation neural network, blending weights corresponding to a set of candidate 3D patches for the patch region;
generate, utilizing the blending-deformation neural network, transformations corresponding to the set of candidate 3D patches for the patch region; and
blend the plurality of candidate 3D patches for the patch region utilizing the blending weights and the transformations.

11. The system of claim 10, wherein the one or more processing devices are further configured to train the blending-deformation neural network utilizing a reconstruction loss and a smoothness loss.

12. The system of claim 9, wherein the incomplete 3D digital shape has a first resolution and the one or more processing devices are further configured to cause the system to generate the coarse 3D digital shape utilizing the machine learning model by utilizing a convolutional neural network to generate a 3D shape having a second resolution lower than the first resolution.

13. The system of claim 9, wherein the one or more processing devices are further configured to generate the geometric similarity measures by:
generating, utilizing one or more encoders, a coarse 3D patch encoding in a feature space from the first coarse 3D patch; and
generating, utilizing the one or more encoders, a plurality of 3D patch encodings in the feature space from the plurality of 3D patches.

14. The system of claim 13, wherein the one or more processing devices are further configured to generate the geometric similarity measures based on distances between the coarse 3D patch encoding and the plurality of 3D patch encodings within the feature space.

15. A non-transitory computer readable medium comprising instructions that, when executed by at least one processor, cause the at least one processor to perform operations comprising:
generating, utilizing a convolutional neural network, a coarse 3D digital shape from an incomplete 3D digital shape;

extracting a plurality of candidate 3D patches corresponding to a plurality of coarse 3D patches sampled from across the coarse 3D digital shape by:
  generating, utilizing an encoder, candidate 3D patch encodings from the plurality of candidate 3D patches and a candidate coarse 3D patch encoding from the plurality of coarse 3D patches; and
  comparing distances between the candidate 3D patch encodings and the candidate coarse 3D patch encoding; and
generating a complete 3D shape by determining transformations and blending weights for the plurality of candidate 3D patches.

16. The non-transitory computer readable medium of claim 15, wherein generating the complete 3D shape comprises applying the transformations to the plurality of candidate 3D patches to generate transformed candidate 3D patches.

17. The non-transitory computer readable medium of claim 16, wherein generating the complete 3D shape comprises blending the transformed candidate 3D patches utilizing the blending weights.

18. The non-transitory computer readable medium of claim 15, further comprising instructions that, when executed by the at least one processor, cause the at least one processor to perform operations comprising:
  determining an additional coarse 3D patch from the coarse 3D digital shape;
  retrieving an additional plurality of candidate 3D patches based on the additional coarse 3D patch; and
  generating the complete 3D shape utilizing the plurality of candidate 3D patches and the additional plurality of candidate 3D patches.

19. The non-transitory computer readable medium of claim 18, further comprising instructions that, when executed by the at least one processor, cause the at least one processor to perform operations comprising:
  generating a first 3D sub-volume by blending the plurality of candidate 3D patches utilizing a first set of transformations and a first set of blending weights; and
  generating a second 3D sub-volume by blending the additional plurality of candidate 3D patches utilizing a second set of transformations and a second set of blending weights.

20. The non-transitory computer readable medium of claim 19, wherein generating the complete 3D shape comprises combining the first 3D sub-volume and the second 3D sub-volume.

* * * * *